(12) United States Patent
Miyahara

(10) Patent No.: US 9,030,240 B2
(45) Date of Patent: May 12, 2015

(54) SIGNAL PROCESSING DEVICE, SIGNAL PROCESSING METHOD AND COMPUTER READABLE MEDIUM

(75) Inventor: Ryoji Miyahara, Tokyo (JP)

(73) Assignee: NEC Corporation, Tokyo (JP)

( * ) Notice: Subject to any disclaimer, the term of this patent is extended or adjusted under 35 U.S.C. 154(b) by 11 days.

(21) Appl. No.: 13/988,690

(22) PCT Filed: Nov. 21, 2011

(86) PCT No.: PCT/JP2011/077286
§ 371 (c)(1),
(2), (4) Date: May 21, 2013

(87) PCT Pub. No.: WO2012/070671
PCT Pub. Date: May 31, 2012

(65) Prior Publication Data
US 2013/0251079 A1      Sep. 26, 2013

(30) Foreign Application Priority Data

Nov. 24, 2010   (JP) .................................. 2010-261831

(51) Int. Cl.
| H03C 5/00 | (2006.01) |
| H04L 27/34 | (2006.01) |
| H04B 1/10 | (2006.01) |
| G10L 21/0208 | (2013.01) |

(Continued)

(52) U.S. Cl.
CPC . *H04B 1/10* (2013.01); *G10L 25/18* (2013.01); *G10L 21/0208* (2013.01); *G10L 21/0232* (2013.01)

(58) Field of Classification Search
None
See application file for complete search history.

(56) References Cited

U.S. PATENT DOCUMENTS

| 6,526,378 B1 | 2/2003 | Tasaki |
| 7,254,195 B2 * | 8/2007 | Servilio et al. ................ 375/345 |

(Continued)

FOREIGN PATENT DOCUMENTS

| JP | 10-149198 A | 6/1998 |
| JP | 2000-181498 A | 6/2000 |

(Continued)

OTHER PUBLICATIONS

Akihiko Sugiyama, "Single-Channel Impact-Noise Suppression With no Auxiliary Information for Its Detection", Proc. IEEE Workshop on Applications of Signal Processing to Audio and Acoustics, Oct. 21-24, 2007, New Paltz, NY, pp. 127-130.

(Continued)

*Primary Examiner* — Lincoln Donovan
*Assistant Examiner* — Terry L Englund
(74) *Attorney, Agent, or Firm* — Sughrue Mion, PLLC

(57) ABSTRACT

A signal processing device enables a high quality enhanced signal to be obtained, and includes: a transform unit which transforms a mixed signal in which a first signal and a second signal are mixed, into a phase component and an amplitude component or a power component in each frequency; a first control unit which rotates the phase component in a predetermined frequency; a second control unit which compensates the amplitude component or the power component in the predetermined frequency according to the amount of change of the amplitude component or the power component rotated by the first control unit; and a synthesizing unit which synthesizes the phase component rotated by the first control unit, and the amplitude component or the power component compensated by the second control unit.

10 Claims, 19 Drawing Sheets

(51) Int. Cl.
*G10L 21/0232* (2013.01)
*G10L 25/18* (2013.01)

(56) References Cited

U.S. PATENT DOCUMENTS

| | | | |
|---|---|---|---|
| 7,945,223 B2* | 5/2011 | Lewis | 455/108 |
| 8,107,898 B2* | 1/2012 | Matsuura | 455/102 |
| 8,169,248 B2* | 5/2012 | Chen et al. | 327/233 |
| 8,509,300 B2* | 8/2013 | Vromans | 375/238 |
| 8,660,209 B2* | 2/2014 | Kao et al. | 375/300 |
| 2003/0177007 A1 | 9/2003 | Kanazawa et al. | |
| 2004/0052383 A1 | 3/2004 | Acero et al. | |
| 2008/0219470 A1 | 9/2008 | Kimijima | |
| 2009/0196434 A1 | 8/2009 | Sugiyama et al. | |
| 2010/0010808 A1 | 1/2010 | Sugiyama et al. | |
| 2011/0305171 A1* | 12/2011 | Matsuura et al. | 370/278 |
| 2013/0332500 A1* | 12/2013 | Sugiyama et al. | 708/300 |

FOREIGN PATENT DOCUMENTS

| | | |
|---|---|---|
| JP | 2003-271191 A | 9/2003 |
| JP | 2004-102287 A | 4/2004 |
| JP | 2008-209768 A | 9/2008 |
| JP | 2008-227595 A | 9/2008 |
| JP | 2010-237703 A | 10/2010 |
| WO | 99/30315 A1 | 6/1999 |
| WO | 2007/026691 A1 | 3/2007 |
| WO | 2007/029536 A1 | 3/2007 |

OTHER PUBLICATIONS

Masanori Kato, et al., "Noise Suppression With High Speech Quality Based on Weighted Noise Estimation and MMSE STSA", IEICE Transactions on Fundamentals of Electronics, Communications and Computer Sciences (Japanese Edition), Jul. 2004, pp. 851-860, vol. J87-A, No. 7.

Rainer Martin, "Spectral Subtraction Based on Minimum Statistics", Proc. EUSPICO-94, Sep. 1994, pp. 1182-1185.

* cited by examiner

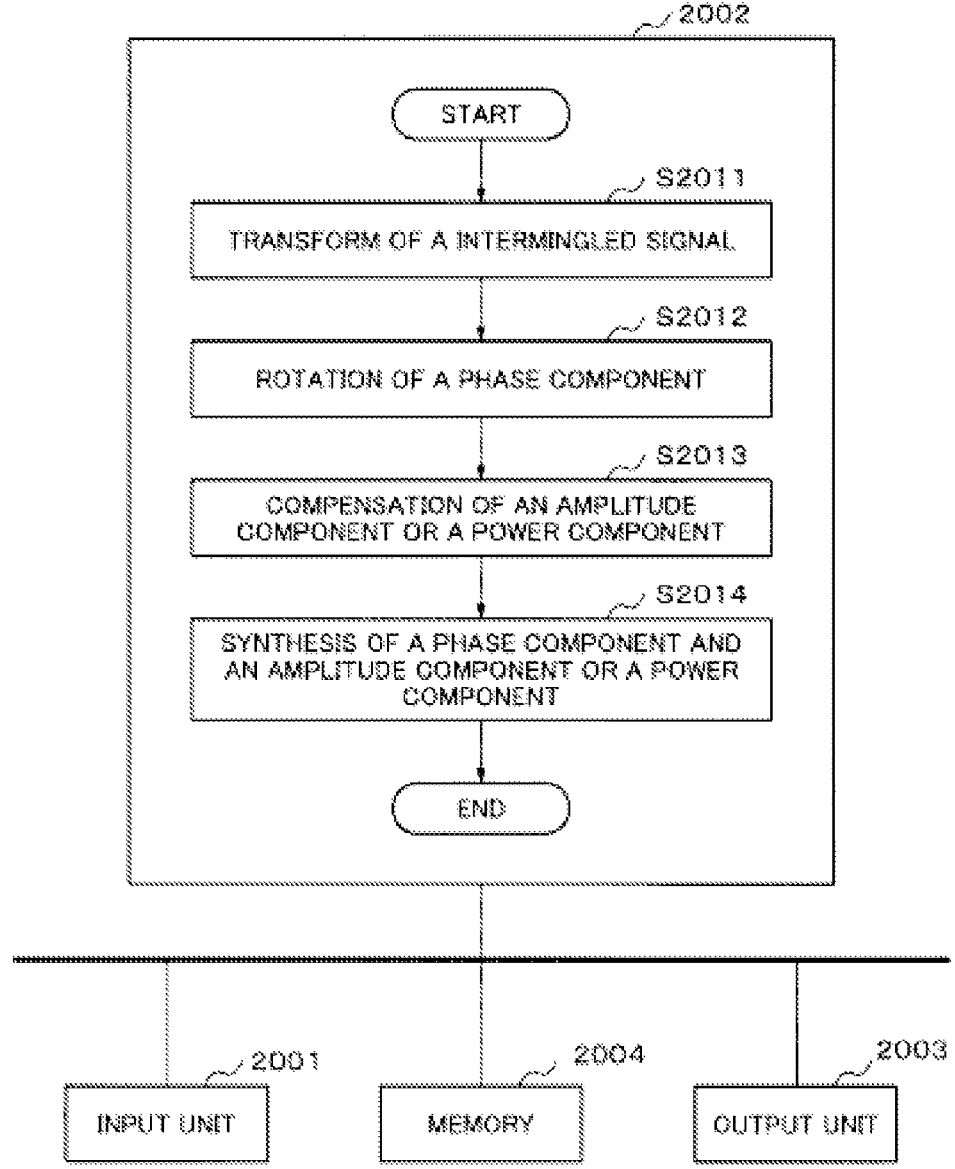

SIGNAL PROCESSING DEVICE, SIGNAL PROCESSING METHOD AND COMPUTER READABLE MEDIUM

CROSS REFERENCE TO RELATED APPLICATIONS

This application is a National Stage of International Application No. PCT/JP2011/077286filed Nov. 21, 2011, claiming priority based on Japanese Patent Application No. 2010-261831, filed Nov. 24, 2010, the contents of all of which are incorporated herein by reference in their entirety.

FIELD OF THE INVENTION

The present invention relates to a signal processing technology for controlling a phase component of a signal.

BACKGROUND OF THE INVENTION

As a technological example for controlling a phase component of a signal and performing signal processing, a technology of noise suppression which is focused on a phase spectrum is disclosed in patent document 1 and non-patent document 1. The technologies described in patent document 1 and non-patent document 1 suppress an amplitude spectrum related to a noise and randomly shifts the phase spectrum by a value smaller then or equal to $\pi/4$ simultaneously. The technologies described in patent document 1 and non-patent document 1 realize a suppression of the noise which cannot be suppressed only by attenuation of the noise spectrum by shifting the phase spectrum at random.

PRIOR ART DOCUMENT

Patent Document

[Patent document 1] International Publication WO2007/029536

Non-Patent Document

[Non-patent document 1] Akihiko Sugiyama, "Single-Channel Impact-Noise Suppression with no Auxiliary Information for its Detection", Proc. IEEE Workshop on Application of Signal Processing to Audio and Acoustics (WASPAA), pp. 127-130 and 21-24 Oct. 2007.

SUMMARY OF THE INVENTION

Problems to be Solved by the Invention

However, when the phase spectrum is shifted at random like the technologies described in patent document 1 and non-patent document 1, mismatch of the phase spectrum occurs between neighbored frames, and a signal level declines at the time of frame synthesis. As a result, the difference occurs in output signal levels between the noise suppression period and the noise non-suppression period, and a quality of the output signal declines.

An object of the present invention is to provide a signal processing technology which solves the above-mentioned problems.

Means for Solving the Problem

In order to achieve the above-mentioned object, an apparatus according to the present invention includes: a transform means for transforming a mixed signal in which a first signal and second signal are mixed into a phase component and an amplitude component or a power component in each frequency; a first control means for rotating the phase component in predetermined frequency; a second control means for compensating the amplitude component or the power component in the predetermined frequency according to the amount of change of the amplitude component or the power component rotated by the first control means; and a synthesis means for synthesizing the phase component rotated by the first control means and the amplitude component or the power component compensated by the second control means.

In order to achieve the above-mentioned object, a method according to the present invention includes: a transform step of transforming a mixed signal in which a first signal and second signal are mixed into a phase component and an amplitude component or a power component in each frequency; a first control step of rotating the phase component in predetermined frequency; a second control step of compensating the amplitude component or the power component in the predetermined frequency according to the amount of change of the amplitude component or the power component generated by the rotation performed by the first control step; and a synthesis step of synthesizing the phase component rotated by the first control step and the amplitude component or the power component compensated by the second control step.

In order to achieve the above-mentioned object, a computer readable medium embodying a program, said program causing a signal processing device to perform a method, said method comprising: a transform step of transforming a mixed signal in which a first signal and a second signal are mixed into a phase component and an amplitude component or a power component in each frequency; a first control step of rotating the phase component in a predetermined frequency; a second control step of compensating the amplitude component or the power component in the predetermined frequency according to the amount of change of the amplitude component or the power component generated by the rotation performed by said first control step; and a synthesis step of synthesizing the phase component rotated by said first control step and the amplitude component or power component compensated by said second control step.

Effect of the Invention

According to the present invention, a signal processing technology which controls a phase component of an input signal without deteriorating a quality of an output signal can be provided.

BRIEF DESCRIPTION OF THE DRAWINGS

FIG. 20 It is a block diagram showing a schematic configuration of a noise suppression device as other exemplary embodiments of the present invention.

EXEMPLARY EMBODIMENT OF THE INVENTION

Exemplary embodiments of the present invention will be described in detail exemplarily with reference to drawings below. However, components described in the following exemplary embodiments are illustrations to the last, and they are not aimed at limiting the technical range of the present invention only by them.

(First Exemplary Embodiment)

Figure 1:
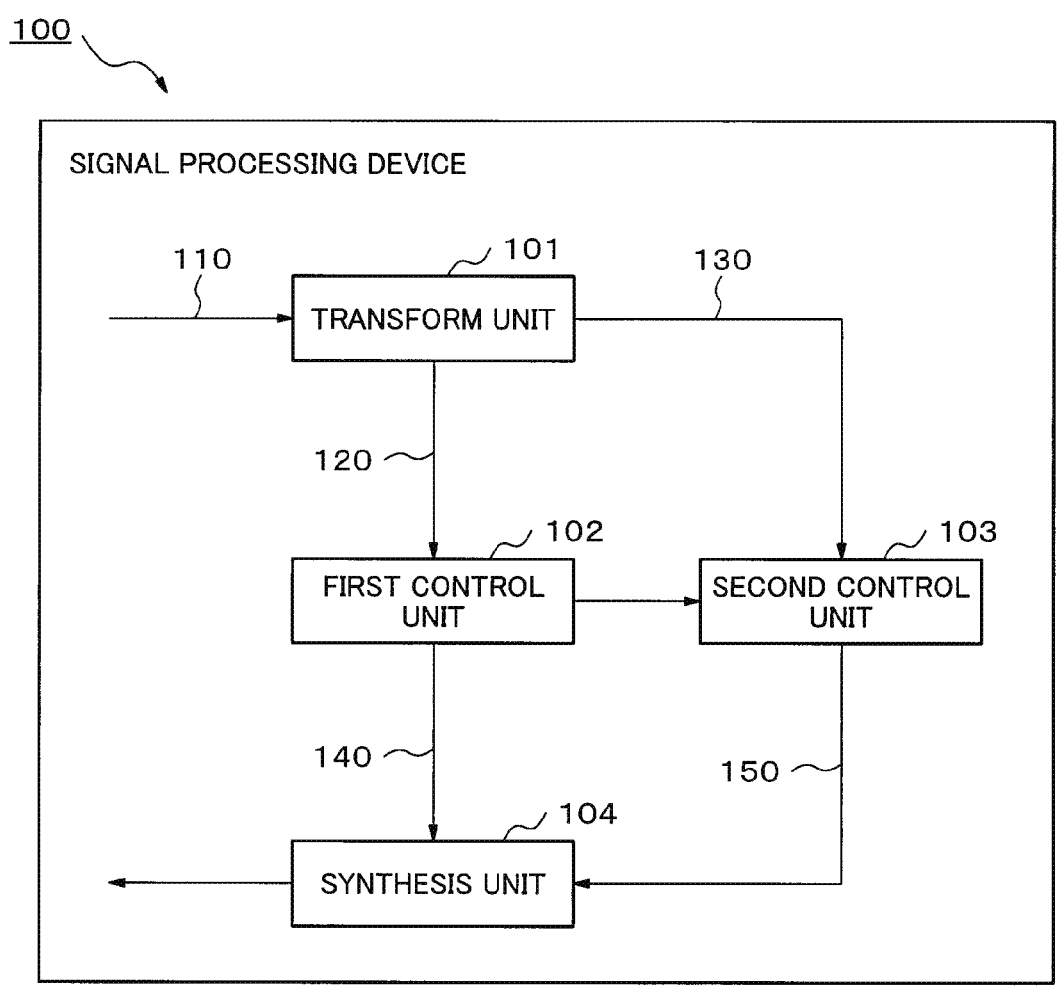
FIG. 1 It is a block diagram showing a schematic configuration of a signal processing device as a first exemplary embodiment of the present invention.

FIG. 1 is a chart showing a schematic configuration of a signal processing device 100 according to a first exemplary embodiment of the present invention.

In FIG. 1, the signal processing device 100 includes a transform unit 101, a first control unit 102, a second control unit 103 and a synthesis unit 104. The transform unit 101 transforms a mixed signal 110 in which a first signal and a second signal are mixed into a phase component 120 and an amplitude component or a power component 130 in each frequency. Alternatively, the first control unit 102 rotates the phase component 120 in predetermined frequency. In addition, the second control unit 103 compensates the amplitude component or the power component in predetermined frequency corresponding to the amount of change of the amplitude component or the power component due to the rotation which the first control unit 102 performed. On the other hand, the synthesis unit 104 synthesizes a phase component 140 rotated by the first control unit 102, and the amplitude component or the power component 150 compensated by the second control unit 103.

Based on the above mentioned construction, the signal processing device 100 according to the first exemplary embodiment can control the phase component of an input signal without deteriorating a quality of an output signal.

(Second Exemplary Embodiment)

<<Entire Configuration>>

Figure 2:
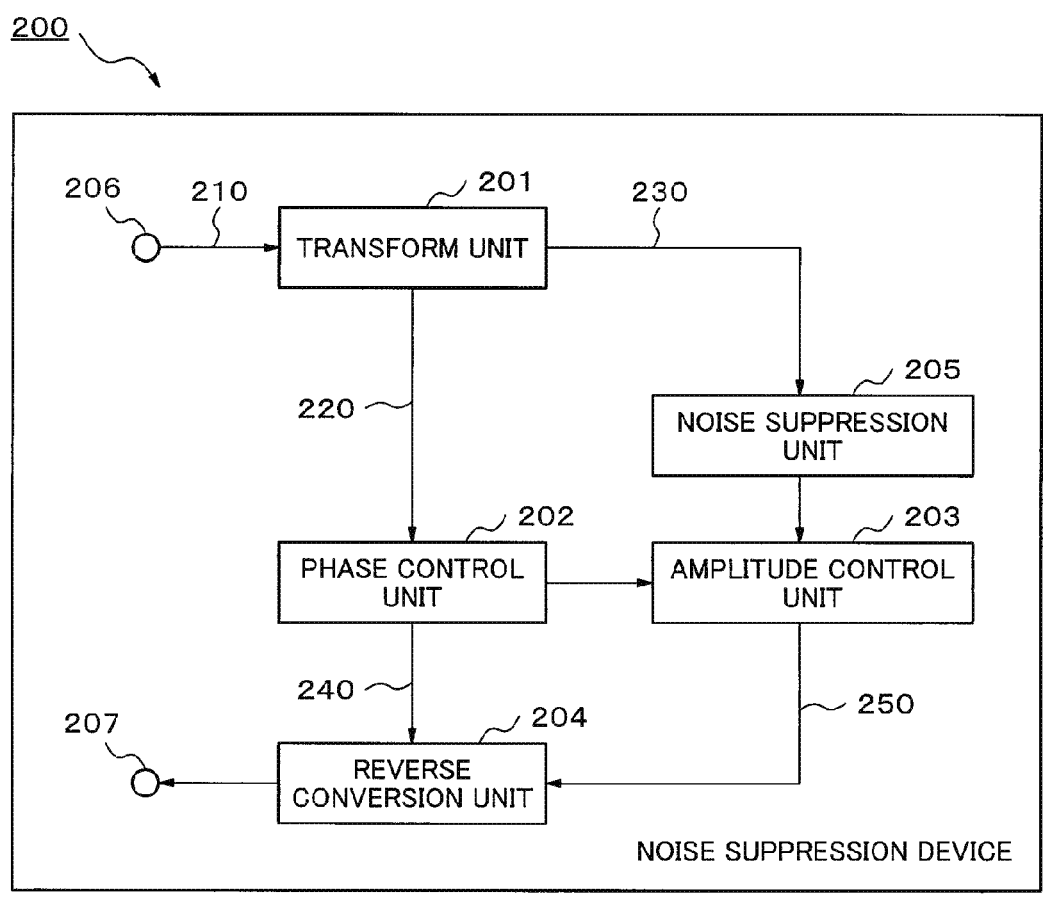
FIG. 2 It is a block diagram showing a schematic configuration of a noise suppression device as a second exemplary embodiment of the present invention.

A noise suppression device 200 as a second exemplary embodiment of the present invention will be described using FIGS. 2 to 11. FIG. 2 is a block diagram showing an entire configuration of the noise suppression device 200. For example, the noise suppression device 200 of this exemplary embodiment also functions as a part of an apparatus such as a digital camera, a laptop computer and a cellular phone, but the present invention is not limited to these. The noise suppression device 200 is applicable to all information processing devices of which is required denoising from an input signal.

A noisy signal (a mixed signal of a desired signal and a noise) is supplied to an input terminal 206 as a sample value series. When the noisy signal is supplied to the input terminal 206, a transform unit 201 gives the supplied noisy signal a transformation of a Fourier transform and so on, and divides into a plurality of frequency components. The transform unit 201 processes the plurality of frequency components in each frequency independently. Here, explanation is continued paying attention to a specific frequency component. The transform unit 201 supplies an amplitude spectrum (amplitude component) 230 among the plurality of frequency components to a noise suppression unit 205. The transform unit 201 supplies a phase spectrum (phase component) 220 among the plurality of frequency components to a phase control unit 202. In addition, here, although the transform unit 201 supplies the noisy signal amplitude spectrum 230 to the noise suppression unit 205, the present invention is not limited to this. The transform unit 201 may supply a power spectrum corresponding to a square of the noisy signal amplitude spectrum 230 to the noise suppression unit 205.

The noise suppression unit 205 presumes a noise using the noisy signal amplitude spectrum 230 supplied from the transform unit 201, and generates an estimated noise spectrum. And, the noise suppression unit 205 suppresses a noise using the noisy signal amplitude spectrum 230 supplied from the transform unit 201 and the generated estimated noise spectrum. The noise suppression unit 205 transmits an enhanced signal amplitude spectrum as a noise suppression result to an amplitude control unit 203. The phase control unit 202 rotates (shifts) the noisy signal phase spectrum 220 supplied from the transform unit 201, and supplies it, as an enhanced signal phase spectrum 240, to a reverse transform unit 204. And, the phase control unit 202 transmits the rotation amount (shift amount) of the phase to the amplitude control unit 203. The amplitude control unit 203 receives the rotation amount (shift amount) of the phase from the phase control unit 202 and calculates an amplitude compensation amount. The amplitude control unit 203 compensates the enhanced signal amplitude spectrum in each frequency using the amplitude compensation amount, and generates a compensated amplitude spectrum 250. The amplitude control unit 203 supplies the compensated amplitude spectrum 250 to the reverse transform unit 204. The reverse transform unit 204 synthesizes the enhanced signal phase spectrum 240 supplied from the phase control unit 202 and the compensated amplitude spectrum 250 supplied from the amplitude control unit 203, performs inverse transform, and supplies it to an output terminal 207 as an enhanced signal.

<<Construction of the Transform Unit 201>>

Figure 3:
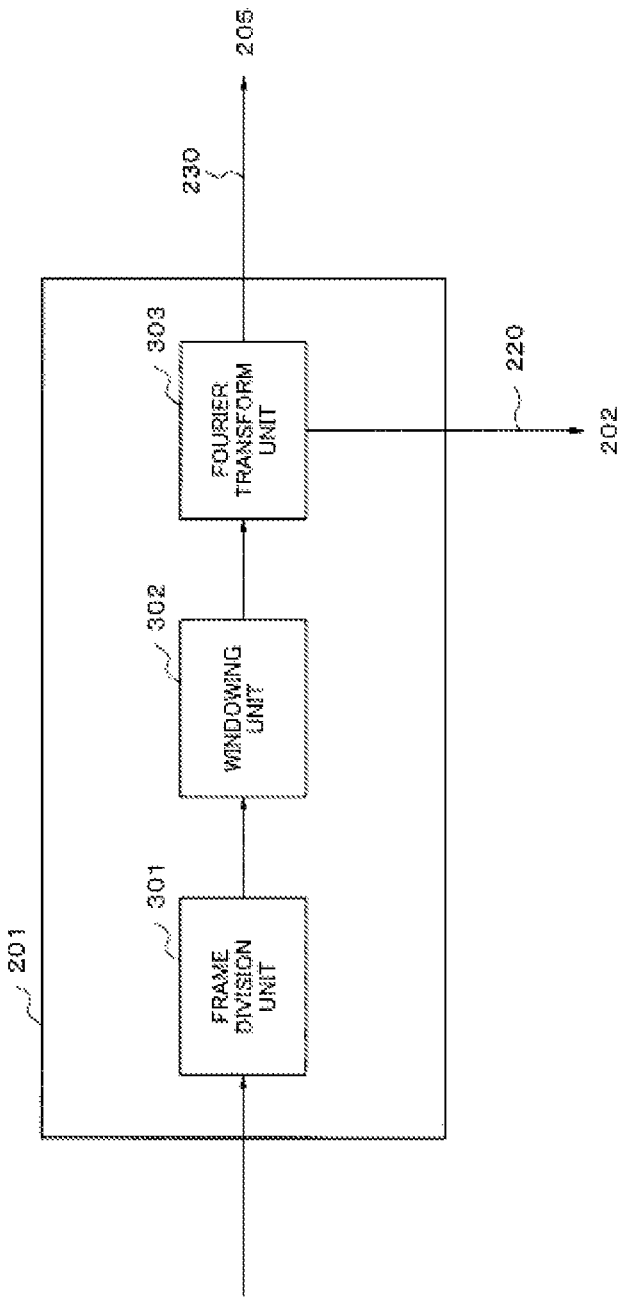
FIG. 3 It is a block diagram showing a construction of a transform unit included in the second exemplary embodiment of the present invention.

FIG. 3 is a block diagram showing a construction of the transform unit 201. As shown in FIG. 3, the transform unit 201 includes a frame division unit 301, a windowing unit (windowing unit) 302, and a Fourier transform unit 303. A noisy signal sample is supplied to the frame division unit 301, and it is divided into frames for each K/2 samples. Here, K is an even number. The noisy signal sample divided into frames is supplied to the windowing unit 302, and it is multiplied together with w(t) which is a window function. A signal windowed by w(t), which is corresponding to an input signal yn(t) (t=0 and 1, . . . , K/2−1) of the n th frame is given by following equation (1).

[Equation 1]

$$\bar{y}_n(t) = w(t) y_n(t) \quad (1)$$

And, the windowing unit 302 may pile up (overlap) parts of continuous two frames, and window them. When assuming 50% of the frame length as the overlap length, a left side obtained by the following equation (2) according to t=0 and 1, . . . , K/2−1 is an output of the windowing unit 302.

[Equation 2]

$$\begin{aligned} \bar{y}_n(t) &= w(t) y_{n-1}(t + K/2) \\ \bar{y}_n(t + K/2) &= w(t + K/2) y_n(t) \end{aligned} \quad (2)$$

The windowing unit 302 may use a symmetrical window function to a real number signal. And, the window function is designed so that an input signal and an output signal is in accord except for a calculation error when the suppression coefficient in MMSESTSA method is set to 1, or zero is subtracted in SS method. This means becoming w(t)+w(t+K/2)=1.

After this, the explanation is continued taking the case as an example where the windowing is performed by overlapping 50% of the continuous two frames. The windowing unit 302 may use a Hanning window shown by the following equation (3) as w(t), for example.

[Equation 3]

$$w(t) = \begin{cases} 0.5 + 0.5 \cos\left(\dfrac{\pi(t - K/2)}{K/2}\right), & 0 \le t < K \\ 0, & \text{otherwise} \end{cases} \quad (3)$$

Additionally, various window functions such as a Hamming window and a triangular window are also known. A windowed output is supplied to the Fourier transform unit 303, and is transformed to a noisy signal spectrum Yn(k). The noisy signal spectral Yn(k) is separated to a phase and an amplitude, and the noisy signal phase spectrum argYn(k) is supplied to the phase control unit 202 and the noisy signal amplitude spectrum |Yn(k)| is supplied to the noise suppression unit 205. As already described, the power spectrum may be used instead of the amplitude spectrum.

<<Construction of the Reverse Transform Unit 204>>

Figure 4:
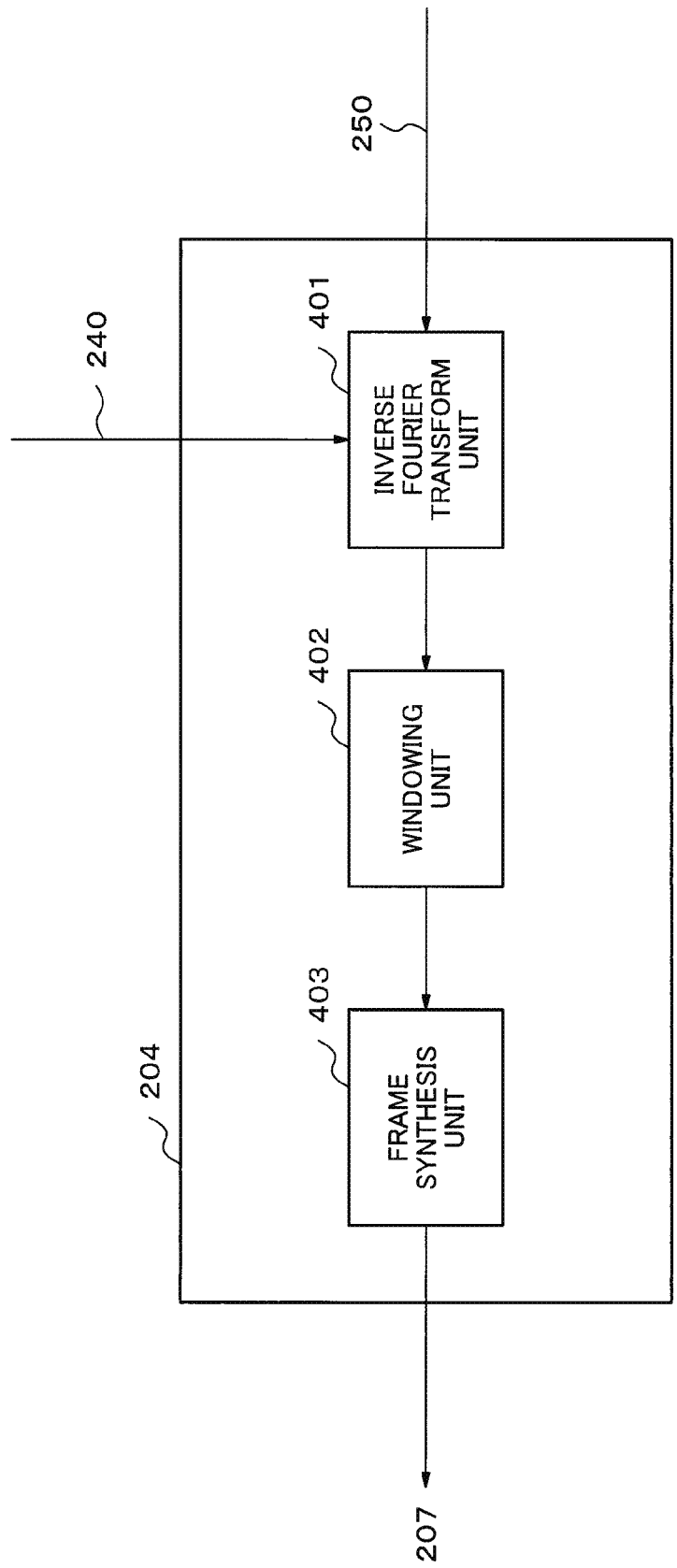
FIG. 4 It is a block diagram showing a construction of a reverse transform unit included in the second exemplary embodiment of the present invention.

FIG. 4 is a block diagram showing a construction of the reverse transform unit 204. As shown in FIG. 4, the reverse transform unit 204 includes an inverse Fourier transform unit 401, a windowing unit 402 and a frame synthesis unit 403. The inverse Fourier transform unit 401 multiplies the compensated amplitude spectrum 250 supplied from the amplitude control unit 203 and the enhanced signal phase spectrum argXn(k) supplied from the phase control unit 202 together, and obtains an enhanced signal (left side of the following equation (4)).

[Equation 4]

$$\bar{X}_n(k) = |\bar{X}_n(k)| \cdot \arg X_n(k) \quad (4)$$

The inverse Fourier transform unit 401 performs the inverse Fourier transform to the obtained enhanced signal. As time domain sample value series xn(t) (t=0 and 1, . . . , K−1) where one frame includes K samples, the enhanced signal which is transformed into the inverse Fourier is supplied to the windowing unit 402, and it is multiplied by a window function w(t). A signal windowed by w(t), which is corresponding to an input signal xn(t) (t=0 and 1, . . . , K/2−1) of the n th frame is given by a left side of the following equation (5).

[Equation 5]

$$\bar{x}_n(t) = w(t) x_n(t) \quad (5)$$

And, the windowing unit 402 may pile up (overlap) parts of continuous two frames, and may window them. When assuming 50% of the frame length as the overlap length, a left side obtained by the following equation will be an output of the windowing unit 402 to t=0 and 1, . . . , K/2−1, and it is transmitted to the frame synthesis unit 403.

[Equation 6]

$$\begin{aligned} \bar{x}_n(t) &= w(t) x_{n-1}(t + K/2) \\ \bar{x}_n(t + K/2) &= w(t + K/2) x_n(t) \end{aligned} \quad (6)$$

The frame synthesis unit 403 takes out the outputs of two frames adjacent from the windowing unit 402 at K/2 samples respectively, pile them up, and obtains an output signal (a left side of the equation (7)) at t=0 and 1, . . . , K−1 by using the following equation (7). The obtained output signal is transmitted from the frame synthesis unit 403 to the output terminal 207.

[Equation 7]

$$\hat{x}_n(t) = \bar{x}_{n-1}(t + K/2) + \bar{x}_n(t) \quad (7)$$

In addition, although the transform in the transform unit 201 and the reverse transform unit 204 is described as the Fourier transform in FIG. 3 and FIG. 4, the transform unit 201 and the reverse transform unit 204 may use other transforms such as Hadamard transform, Haar transform, wavelet transform and so on instead of the Fourier transform. When the transform unit 201 and the reverse transform unit 204 use the Haar transform, multiplication becomes unnecessary and they can be reduced an area when integrated to an LSI. When the transform unit 201 and the reverse transform unit 204 use the wavelet transform, because they can change time resolution into a different value according to the frequency, an improvement of the noise suppression effect is expectable.

And, an actual suppression may be performed in the noise suppression unit 205 after unifying a plurality of frequency components obtained in the transform unit 201. In that case, a high quality of sound can be achieved by unifying more frequency components from a low frequency region where distinction ability of an aural characteristic is high toward a high frequency region where the ability is low. Thus, when noise suppression is carried out after unifying a plurality of frequency components, the number of the frequency components to which noise suppression is applied decreases, and the whole operation amount can be reduced.

<<Construction of the Noise Suppression Unit 205>>

The noise suppression unit 205 presumes a noise using a noisy signal amplitude spectrum supplied from the transform unit 201, and generates an estimated noise spectrum. The noise suppression unit 205 obtains a suppression coefficient using the noisy signal amplitude spectrum from the transform unit 201 and the generated estimated noise spectrum. The noise suppression unit 205 multiplies the noisy signal amplitude spectrum by the obtained suppression coefficient, and supplies it to the amplitude control unit 203 as an enhanced signal amplitude spectrum.

Various estimation method can be used as indicated by M. Kato, A. Sugiyama, and M. Serizawa, "Noise suppression with high speech quality based on weighted noise estimation and MMSE STSA," IEICE Trans. Fundamentals (Japanese Edition), vol. J87-A, no. 7, pp. 851-860, July 2004. (document 1) and R. Martin, "Spectral subtraction based on minimum statistics," EUSPICO-94, pp. 1182-1185, September 1994 (document 2) in a presumption of noise.

For example, there is a method (document 1) to make the estimated noise spectrum a mean value of the noisy signal amplitude spectrum of a frame in which the object sound does not occur. In this method, it is necessary to detect occurrence of the object sound. A period which the object sound occurs can be judged by power of the enhanced signal.

As an ideal operation state, the enhanced signal becomes the object sound other than the noise. And, the level of the object sound and the noise does not change largely between adjacent frames. Because of these, the enhanced signal level of the one-frame past is made an index of judgment of the noise period. When the enhanced signal power of the one-frame past is a steady value or less, a current frame is judged a noise period. The noise spectrum is presumed by equalizing the noisy signal amplitude spectrum of frame judged as the noise period.

And, there is also the method (document 1) to make the estimated noise spectrum a mean value in an early stage of presumption when the noisy signal amplitude spectrum began to be supplied. In this case, the condition that the object sound is not included just after the presumption has been begun needs to be satisfied. When the condition is satisfied, the noisy signal amplitude spectrum in the early stage of presumption is set to the estimated noise spectrum.

Moreover, there is also the method (document 2) to obtain the estimated noise spectrum from a minimum value of a statistical noisy signal amplitude spectrum. In this method, a minimum value of a noisy signal amplitude spectrum in a fixed time is held and the noise spectrum is presumed from the minimum value statistically. Because the minimum value of the noisy signal amplitude spectrum resembles the spectral shape of the noise spectrum, it can be used as an estimate value of the shape of the noise spectrum. However, in the minimum value, the noisy signal amplitude spectrum becomes smaller than the original noise level. Therefore, what is made a minimum value be amplified appropriately is used as the estimated noise spectrum.

The noise suppression unit 205 can perform various suppressions. In typical suppressing methods, there are SS (Spectrum Subtraction) method and MMSESTSA (Minimum Mean-Square Error Short-Time Spectral Amplitude Estimator) method. When the noise suppression unit 205 uses the SS method, the noise suppression unit 205 subtracts an estimated noise spectrum from a noisy signal amplitude spectrum supplied from the transform unit 201. When the noise suppression unit 205 uses the MMSESTSA method, the noise suppression unit 205 calculates a suppression coefficient using a noisy signal amplitude spectrum supplied from the transform unit 201 and a generated estimated noise spectrum, and multiplies the noisy signal amplitude spectrum by this suppression coefficient. This suppression coefficient is determined so that mean square power of an enhanced signal may me minimized.

The noise suppression unit 205 can perform various noise presumptions. For example, in an estimation method, there is a method which, by using a noisy signal amplitude spectrum of a frame in which the object sound does not occurs, makes a mean value of it an estimated noise spectrum. And, there is also a method which makes a mean value of an initial stage when a noisy signal amplitude spectrum began to be supplied an estimated noise spectrum. Further, there is a method, by observing statistically a minimum value of a noisy signal amplitude spectrum, to make the minimum value an estimated noise spectrum.

<<Construction of the Phase Control Unit 202 and the Amplitude Control Unit 203>>

Figure 5:
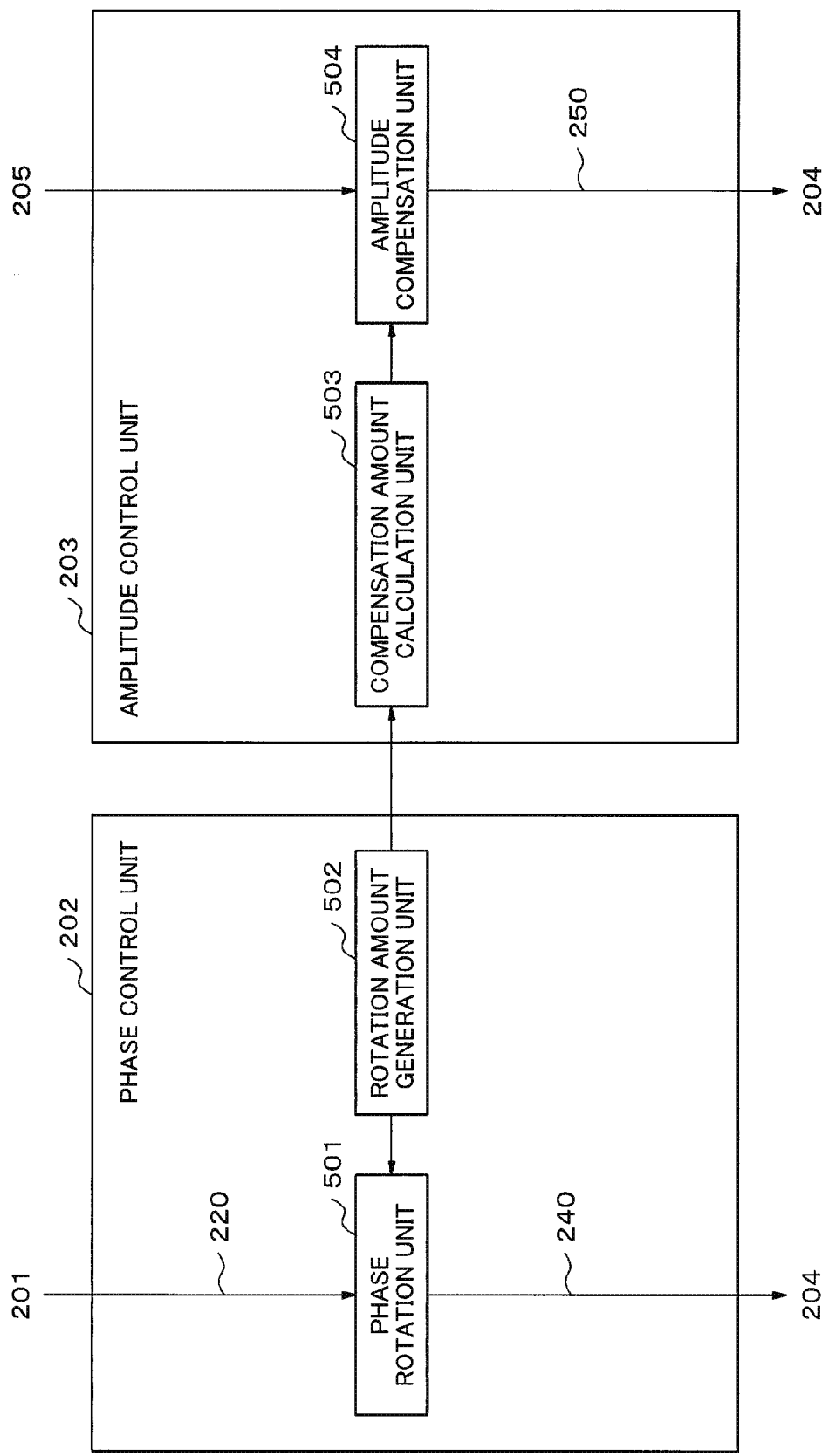
FIG. 5 It is a block diagram showing a construction of a noise suppression unit included in the second exemplary embodiment of the present invention.

FIG. 5 is a block diagram showing a construction of the phase control unit 202 and the amplitude control unit 203. As shown in FIG. 5, the phase control unit 202 includes a phase rotation unit 501 and a rotation amount generation unit 502. The amplitude control unit 203 includes a compensation amount calculation unit 503 and an amplitude compensation unit 504.

The rotation amount generation unit 502 generates rotation amount of a noisy signal phase spectrum and supplies it to the phase rotation unit 501 and the compensation amount calculation unit 503.

The phase rotation unit 501 is supplied the noisy signal phase spectrum 220 from the transform unit 201, and is supplied the rotation amount from the rotation amount generation unit 502. The phase rotation unit 501 rotates (shifts) the noisy signal phase spectrum 220 only the supplied rotation amount, and supplies it to the reverse transform unit 204 as the enhanced signal phase spectrum 240.

The compensation amount calculation unit 503 determines a compensation coefficient of the amplitude based on the rotation amount supplied from the rotation amount generation unit 502 and supplies it to the amplitude compensation unit 504.

For example, the rotation amount generation unit 502 generates the rotation amount using a random number. The phase rotation unit 501 rotates the noisy signal phase spectrum in each frequency using the rotation amount that the rotation amount generation unit 502 generated based on the random number. A shape of the noisy signal phase spectrum 220 changes according to the rotation which the phase rotation unit 501 performs. The feature of the noise can be weakened based on this change of shape.

There are a uniform random number with a uniform probability of occurrence, a normal random number in which a probability of occurrence shows a normal distribution, and so on, in a random number. Here, a generation method of the rotation amount using the uniform random number will be described. The uniform random number occurs by a linear congruential method and so on. Here, the uniform random number by the linear congruential method is given as an example, and the explanation is continued. The uniform random numbers generated by the linear congruential method are distributed over the range of 0 to (2^M)−1 uniformly.

Here, M is an optional integer, and ^ represents exponentiation. Rotation amount ϕ of the phase needs to make a range of 0∼2 π distributed. Therefore, the generated uniform random numbers are transformed so as to be distributed to the range of 0∼2π. The transform is performed by the following equation (8). Here, R is a uniform random number. Rmax is the biggest value of the uniform random numbers generated. When generating by the linear congruential method mentioned above, Rmax will be Rmax=(2 ^M)−1.

[Equation 8]

$$\phi = 2\pi \frac{R}{R_{max}} \quad (8)$$

The value of R may be made the rotation amount just as it is for simplification of the calculation. Because it is the rotation amount, 2π represents one revolution exactly. When rotating 2π of the phase, it is identical with a case where it is not made to rotate. Therefore, the rotation amount as 2π+α becomes the same as a case of α for the rotation amount. Here, although the case where the uniform random number is generated using the linear congruential method has been described, even when the uniform random number is generated by a method other than that method, the rotation amount ϕ may be obtained using the equation (8).

The phase rotation unit 501 receives the rotation amount from the rotation amount generation unit 502, and rotates the noisy signal phase spectrum. When the noisy signal phase spectrum is represented by an angle, the phase rotation unit 501 rotates by adding the value of the rotation amount ϕ to the angle. When the noisy signal phase spectrum is represented by a regular vector of a complex number, the phase rotation unit 501 obtains the regular vector of the rotation amount ϕ, and rotates by multiplying the noisy signal phase spectrum by it.

The regular vector of the rotation amount ϕ is obtained by the equation (9). Here, Φ is a rotation vector. j shows sqrt(−1). Further, the sqrt represents square root.

[Equation 9]

$$\Phi = \cos(\phi) + j\sin(\phi) \quad (9)$$

A compensation coefficient calculation method by the compensation amount calculation unit 503 will be described. First, it is described that a fall of an output level occurs by the rotation of the phase using FIG. 6 and FIG. 7.

Figure 6:
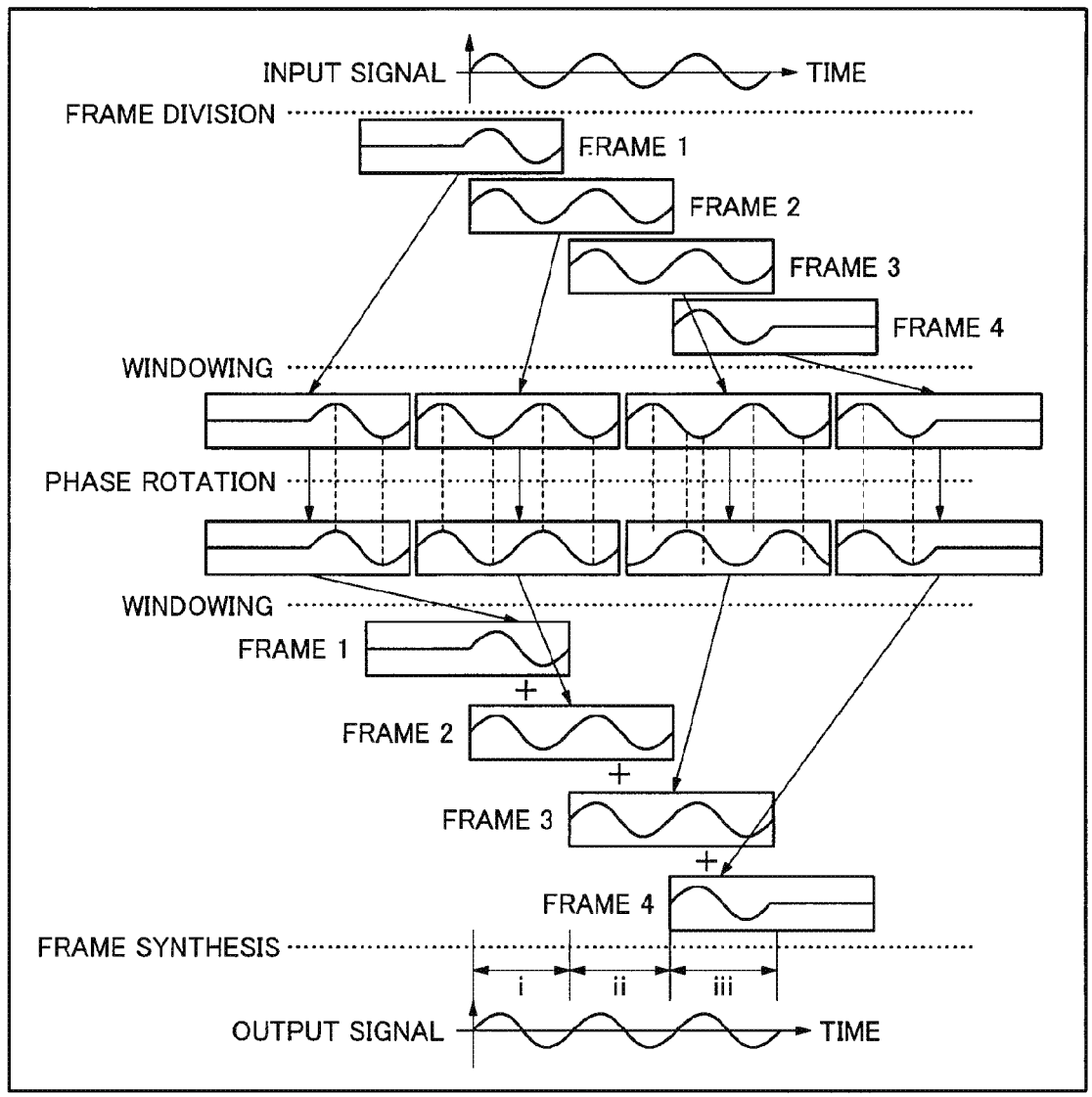
FIG. 6 It is a chart showing a flow of a signal when not performing phase rotation in a frequency domain in the second exemplary embodiment of the present invention.
Figure 7:
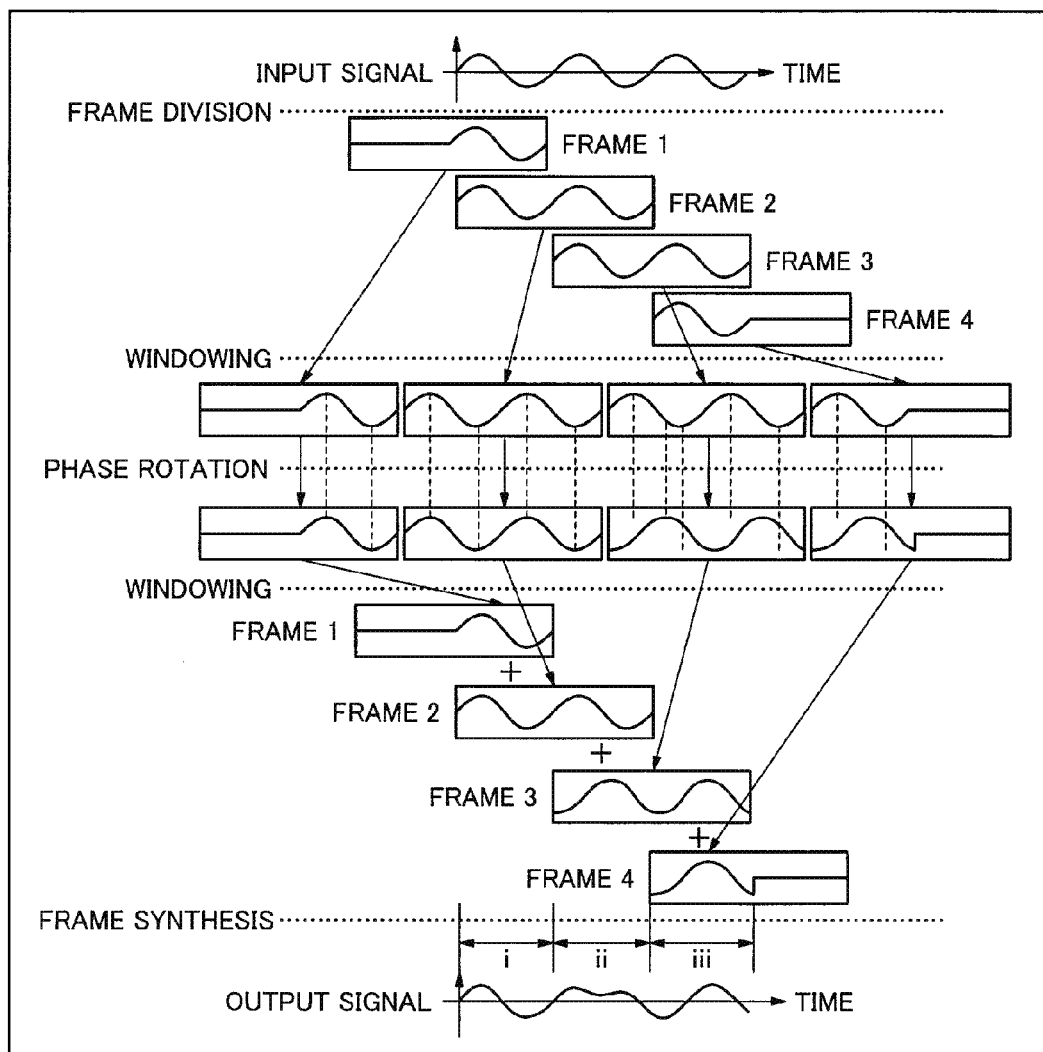
FIG. 7 It is a chart showing a flow of a signal when performing phase rotation in a frequency domain in the second exemplary embodiment of the present invention.

FIG. 6 and FIG. 7 show a signal when a noisy signal is processed with the block diagram shown in FIG. 2. The difference between FIG. 6 and FIG. 7 is the presence or the absence of the phase rotation. FIG. 6 shows the signal when not performing the phase rotation, and FIG. 7 shows the signal when performing the phase rotation from the frame 3.

First, the signal when not rotating the phase will be described using FIG. 6. A drawing on the topmost of FIG. 6 is the noisy signal. It is performed frame division in the frame division unit 301. The second signals from the top which are partitioned by a dotted line are signals after performing the frame division. In FIG. 6, the signals for four continuous frames are shown. And, an overlapping rate of the frames is made 50%.

A windowing processing unit 302 performs windowing to the signals divided into the frames. The third signals from the top which are partitioned by a dotted line are the signals after windowing processing. In FIG. 6, in order to show an influence based on the phase rotation clearly, they are given weight using a rectangle window.

Next, although the signals after windowing processing are transformed into signals of frequency domain using the Fourier transform unit 303, the signals of the frequency domain are omitted in FIG. 6. The lower part from the dotted line of the phase rotation is illustrating signals transformed into a time domain based on the inverse Fourier transform unit 401 of the reverse transform unit 204. The fourth signals from the top which are partitioned by a dotted line are signals after phase rotation. However, because the phase rotation is not performed in FIG. 6, the signals after phase rotation are not changed from the signals after windowing processing.

The enhanced signals outputted from the inverse Fourier transform unit 401 of the reverse transform unit 204 are performed windowing processing once again. In FIG. 6, a case where the weights are given using a rectangle window is shown. The signals performed the windowing processing are synthesized in the frame synthesis unit 403. At that time, it needs to arrange times between the frames. Because the overlapping rate of the frames is 50%, the frames overlap by halves exactly. When a rotation of the phase is not performed, the input signal and the output signal are identical as shown in FIG. 6.

On the other hand, a signal when rotating the phase will be described using FIG. 7. What is shown in FIG. 7 is the signal when the phase rotation is performed from the frame 3. A drawing on the topmost is the same noisy signal as FIG. 6. The signals after frame division and after windowing processing are also similar to FIG. 6.

In FIG. 7, a case where fixed phase rotation was performed from a frame 3 is drawn. A segment of a rightward triangle shown in the lower part of a dotted line of the phase rotation processing is noted. The signals of frames 3 and 4 shift to a time direction by the phase rotation processing. The signals which were performed phase rotation are performed the windowing processing again, and performed frame synthesis. At this time, a difference occurs to the signals of the frame 2 and the frame 3 in the segment in ii in which the frame 2 and the frame 3 overlap. Hereby, an output signal level after the frame synthesis becomes small in the period of ii. That is, when the rotation of the phase is performed, the output signal level declines in the period in ii of FIG. 7.

The fall of the output signal level based on this phase rotation can be described with a vector synthesis of a frequency domain by changing an addition in time domain for an addition of a frequency domain.

Figure 8:
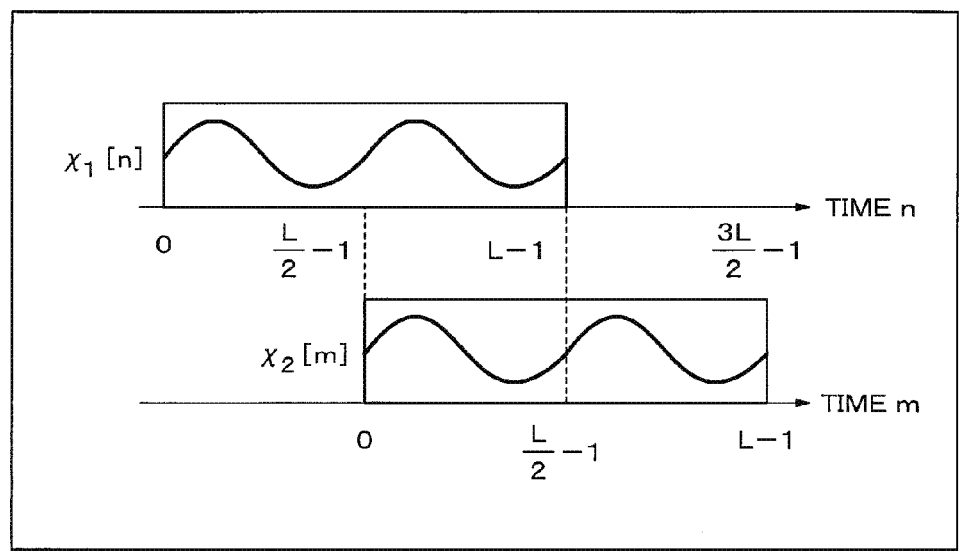
FIG. 8 It is a chart showing overlap addition of a frame when not performing phase rotation in a frequency domain in the second exemplary embodiment of the present invention.

The noisy signals for two continuous frames after frame division and windowing processing are shown in FIG. 8 as x1[n] and x2[m]. Further, the overlapping rate is made 50%. Here, n represents a discrete time of x1. m represents a discrete time of x2. When the overlapping rate is 50%, the following equation (10) is established.

[Equation 10]

$$m = n + \frac{L}{2} \quad (10)$$

And, a relation between x1 and x2 becomes like the following equation (11).

[Equation 11]

$$x_2[m] = x_1\left[n + \frac{L}{2}\right] \tag{11}$$

First, equations of a transform and inverse transform from a time domain signal to a frequency domain signal is shown. A frequency domain signal X[k] is represented like the following equation (12) using a Fourier transformation of a time domain signal x[n]. Here, k representes a discrete frequency and L is a frame length.

[Equation 12]

$$X[k] = \sum_{n=0}^{L-1} x[n]e^{-j2\pi\frac{n}{L}k} \tag{12}$$

And, when the frequency domain signal X[k] is returned to the time domain signal x[n] using an inverse transform, it is represented like the following equation (13).

[Equation 13]

$$x[n] = \frac{1}{L}\sum_{k=0}^{L-1} X[k]e^{j2\pi\frac{n}{L}k} \tag{13}$$

Based on this, when the time domain signals x1[n] and x2[m] are transformed into the frequency domain signal X1[k] and X2[k], they are represented like following equation (14) and equation (15).

[Equation 14]

$$X_1[k] = \sum_{n=0}^{L-1} x_1[n]e^{-j2\pi\frac{n}{L}k} \tag{14}$$

[Equation 15]

$$X_2[k] = \sum_{m=0}^{L-1} x_2[m]e^{-j2\pi\frac{m}{L}k} \tag{15}$$

When the frequency domain signals X1[k] and X2[k] are returned to the time domain signals x1[n] and x2[m] respectively using an inverse transform, they are represented like following equation (16) and equation (17) using the equation (13).

[Equation 16]

$$x_1[n] = \frac{1}{L}\sum_{k=0}^{L-1} X_1[k]e^{j2\pi\frac{n}{L}k} \tag{16}$$

[Equation 17]

$$x_2[m] = \frac{1}{L}\sum_{k=0}^{L-1} X_2[k]e^{j2\pi\frac{m}{L}k} \tag{17}$$

The reverse transform unit transforms the frequency domain signal into the time domain signal using an inverse Fourier transform. After that, the frame synthesis unit 403 performs overlap addition of enhanced sounds of the previous frame and the present frame.

For example, in the overlapping rate 50% of the illustrated example, the frame synthesis unit 403 performs addition of adjacent frames in the period of the discrete time m=L/2~L−1. This addition period m=L/2~L−1 is considered.

When the equations (16) and (17) are substituted for the addition of time domain, it is represented like the following equation (18).

[Equation 18]

$$x_1[n] + x_2[m] = \frac{1}{L}\sum_{k=0}^{L-1} X_1[k]e^{j2\pi\frac{n}{L}k} + \frac{1}{L}\sum_{k=0}^{L-1} X_2[k]e^{j2\pi\frac{m}{L}k} \tag{18}$$

Further, when the equations (14) and (15) are substituted for the frequency domain signal X1[k] and X2[k] in the equation (18), it is represented like the following equation (19).

[Equation 19]

$$x_1[n] + x_2[m] = \frac{1}{L}\sum_{k=0}^{L-1} X_1[k]e^{j2\pi\frac{n}{L}k} + \frac{1}{L}\sum_{k=0}^{L-1} X_2[k]e^{j2\pi\frac{m}{L}k}$$

$$= \frac{1}{L}\sum_{k=0}^{L-1}\left(\sum_{n=0}^{L-1} x_1[n]e^{-j2\pi\frac{n}{L}k}\right)e^{j2\pi\frac{n}{L}k} +$$

$$\frac{1}{L}\sum_{k=0}^{L-1}\left(\sum_{m=0}^{L-1} x_2[m]e^{-j2\pi\frac{m}{L}k}\right)e^{j2\pi\frac{m}{L}k} \tag{19}$$

Further, when the equation (19) is developed, it is represented like the following equation (20).

[Equation 20]

$$x_1[n] + x_2[m] = \frac{1}{L}\sum_{k=0}^{L-1}\left(\sum_{n=0}^{L-1} x_1[n]e^{-j2\pi\frac{n}{L}k}\right)e^{j2\pi\frac{n}{L}k} + \qquad (20)$$

$$\frac{1}{L}\sum_{k=0}^{L-1}\left(\sum_{m=0}^{L-1} x_2[m]e^{-j2\pi\frac{m}{L}k}\right)e^{j2\pi\frac{m}{L}k}$$

$$= \frac{1}{L}\sum_{k=0}^{L-1}\begin{pmatrix} x_1[0]e^{-j2\pi\frac{0}{L}k} + \\ x_1[1]e^{-j2\pi\frac{1}{L}k} + \ldots + \\ x_1[L-1]e^{-j2\pi\frac{L-1}{L}k} \end{pmatrix}e^{j2\pi\frac{n}{L}k} +$$

$$\frac{1}{L}\sum_{k=0}^{L-1}\begin{pmatrix} x_2[0]e^{-j2\pi\frac{0}{L}k} + \\ x_2[1]e^{-j2\pi\frac{1}{L}k} + \ldots + \\ x_2[L-1]e^{-j2\pi\frac{L-1}{L}k} \end{pmatrix}e^{j2\pi\frac{m}{L}k}$$

$$= \frac{1}{L}\left\{ \begin{array}{l} x_1[0]\sum_{k=0}^{L-1} e^{j\frac{2\pi}{L}(n-0)k} + \\ x_1[1]\sum_{k=0}^{L-1} e^{j\frac{2\pi}{L}(n-1)k} + \ldots + \\ x_1[L-1]\sum_{k=0}^{L-1} e^{j\frac{2\pi}{L}(n-L+1)k} \end{array} \right\} +$$

$$\frac{1}{L}\left\{ \begin{array}{l} x_2[0]\sum_{k=0}^{L-1} e^{j\frac{2\pi}{L}(m-0)k} + \\ x_2[1]\sum_{k=0}^{L-1} e^{j\frac{2\pi}{L}(m-1)k} + \ldots + \\ x_2[L-1]\sum_{k=0}^{L-1} e^{j\frac{2\pi}{L}(m-L+1)k} \end{array} \right\}$$

Here, total calculation included in each item of the equation (20) is considered. By introducing an arbitrary integer g, the following equation (21) is established.

[Equation 21]

$$\sum_{k=0}^{L-1} e^{j\frac{2\pi}{L}gk} \qquad (21)$$

An inverse Fourier transform equation of a delta function δ[g] is shown by the equation (22).

[Equation 22]

$$\delta[g] = \frac{1}{L}\sum_{k=0}^{L-1} e^{j\frac{2\pi}{L}gk} \qquad (22)$$

Here, the delta function δ[g] is shown by the following equation (23).

[Equation 23]

$$\delta[g] = \begin{cases} 1 & g=0 \\ 0 & g \neq 0 \end{cases} \qquad (23)$$

The equation (21) can be transformed into the following equation (24) using the equation (22).

[Equation 24]

$$\sum_{k=0}^{L-1} e^{j\frac{2\pi}{L}gk} = L \cdot \delta[g] \qquad (24)$$

The equation (20) is represented by the following equation (25) from the relation of the equation (24).

[Equation 25]

$$x_1[n] + x_2[m] = \qquad (25)$$
$$\frac{1}{L}\{L \cdot x_1[0]\delta[0] + L \cdot x_1[1]\delta[n-1] + \ldots + L \cdot x_1[L-1]\delta[n-L+1]\} +$$
$$\frac{1}{L}\{L \cdot x_2[0]\delta[0] + L \cdot x_2[1]\delta[m-1] + \ldots + L \cdot x_2[L-1]\delta[m-L+1]\}$$

Therefore, the equation (20) becomes the following equation (26).

[Equation 26]

$$x_1[n] + x_2[m] = \frac{1}{L}\{L \cdot x_1[n]\} + \frac{1}{L}\{L \cdot x_2[m]\} \qquad (26)$$
$$= x_1[n] + x_2[m]$$

Figure 9:
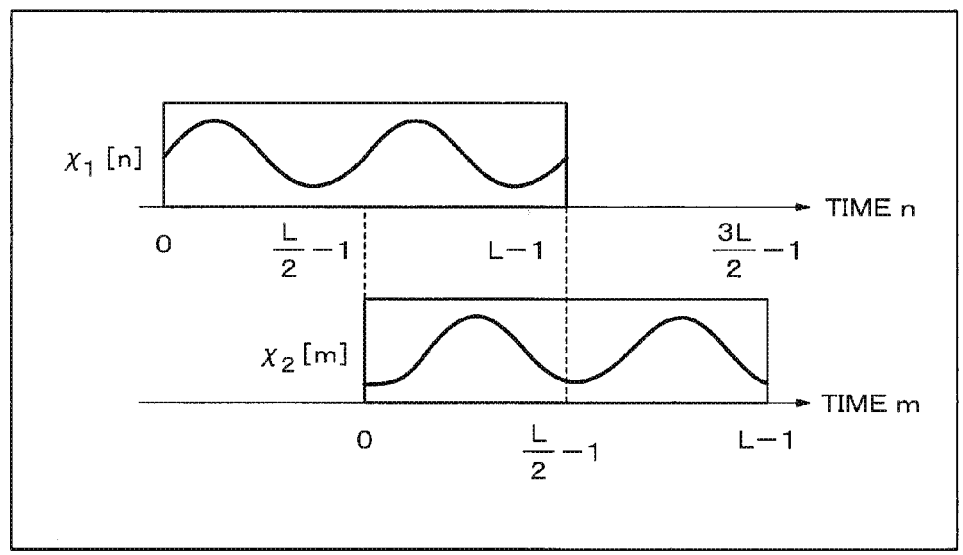
FIG. 9 It is a chart showing overlap addition of a frame when performing phase rotation in a frequency domain in the second exemplary embodiment of the present invention.

By the way, here, a case where phase rotation is performed to the frequency domain signal X2[k] is considered. In this time, a time domain signal becomes as shown in FIG. 9.

When the phase spectrum of X2[k] is rotates φ[k], the inverse transform becomes the following equation (27).

[Equation 27]

$$x_2[m] = \frac{1}{L}\sum_{k=0}^{L-1} X_2[k]e^{j\phi[k]}e^{j2\pi\frac{m}{L}k} \qquad (27)$$

When this is substituted for the equation (18), the following equation (28) is established.

[Equation 28]

$$x_1[n] + x_2[m] = \frac{1}{L}\sum_{k=0}^{L-1} X_1[k]e^{j2\pi\frac{n}{L}k} + \qquad (28)$$
$$\frac{1}{L}\sum_{k=0}^{L-1} X_2[k]e^{j\phi[k]}e^{j2\pi\frac{m}{L}k}$$
$$= \frac{1}{L}\sum_{k=0}^{L-1}\left(\sum_{n=0}^{L-1} x_1[n]e^{-j2\pi\frac{n}{L}k}\right)e^{j2\pi\frac{n}{L}k} +$$
$$\frac{1}{L}\sum_{k=0}^{L-1}\left(\sum_{m=0}^{L-1} x_2[m]e^{-(j2\pi\frac{m}{L}k+\phi[k])}\right)e^{j2\pi\frac{m}{L}k}$$

When this is developed, the following equation (29) is established.

[Equation 29]

$$x_1[n] + x_2[m] = \frac{1}{L}\left\{x_1[0]\sum_{k=0}^{L-1} e^{j\frac{2\pi}{L}(n-0)k} + \right.$$
$$x_1[1]\sum_{k=0}^{L-1} e^{j\frac{2\pi}{L}(n-1)k} + \ldots + x_1[L-1]\sum_{k=0}^{L-1} e^{j\frac{2\pi}{L}(n-L+1)k}\right\} +$$
$$\frac{1}{L}\left\{x_2[0]\sum_{k=0}^{L-1} e^{j\frac{2\pi}{L}(m-0)k} e^{j\phi[k]} + x_2[1]\sum_{k=0}^{L-1} e^{j\frac{2\pi}{L}(m-1)k} e^{j\phi[k]} + \ldots + \right.$$
$$\left. x_2[L-1]\sum_{k=0}^{L-1} e^{j\frac{2\pi}{L}(m-L+1)k} e^{j\phi[k]}\right\}$$

(29)

Here, an overlapping rate is estimated 50%, and an overlap period of n=L/2~L−1 is considered. In the overlap period, it can be developed like the following equation (30) using the equation (11).

[Equation 30]

$$x_1\left[n+\frac{L}{2}\right] + x_2[m] = \frac{1}{L}\left\{\begin{array}{l} x_1\left[\frac{L}{2}\right]\sum_{k=0}^{L-1} e^{j\frac{2\pi}{L}\left(n+\frac{L}{2}-\frac{L}{2}\right)k} + \\ x_1\left[\frac{L}{2}+1\right]\sum_{k=0}^{L-1} e^{j\frac{2\pi}{L}\left(n+\frac{L}{2}-1-\frac{L}{2}+1\right)k} + \ldots + \\ x_1[L-1]\sum_{k=0}^{L-1} e^{j\frac{2\pi}{L}\left(n+\frac{L}{2}-L+1-L-1\right)k} \end{array}\right\} +$$

$$\frac{1}{L}\left\{\begin{array}{l} x_2[0]\sum_{k=0}^{L-1} e^{j\frac{2\pi}{L}(n-0)k} e^{j\phi[k]} + \\ x_2[1]\sum_{k=0}^{L-1} e^{j\frac{2\pi}{L}(n-1)k} e^{j\phi[k]} + \ldots + \\ x_2\left[L-\frac{L}{2}-1\right]\sum_{k=0}^{L-1} e^{j\frac{2\pi}{L}\left(n-\frac{L}{2}-L+1\right)k} e^{j\phi[k]} \end{array}\right\}$$

$$= \frac{1}{L}\left\{\begin{array}{l} x_2[0]\sum_{k=0}^{L-1} e^{j\frac{2\pi}{L}nk} + \\ x_2[1]\sum_{k=0}^{L-1} e^{j\frac{2\pi}{L}nk} + \ldots + \\ x_2\left[L-\frac{L}{2}-1\right]\sum_{k=0}^{L-1} e^{j\frac{2\pi}{L}nk} \end{array}\right\} +$$

$$\frac{1}{L}\left\{\begin{array}{l} x_2[0]\sum_{k=0}^{L-1} e^{j\frac{2\pi}{L}(n-0)k} e^{j\phi[k]} + \\ x_2[1]\sum_{k=0}^{L-1} e^{j\frac{2\pi}{L}(n-1)k} e^{j\phi[k]} + \ldots + \\ x_2\left[L-\frac{L}{2}-1\right]\sum_{k=0}^{L-1} e^{j\frac{2\pi}{L}\left(n-\frac{L}{2}-L+1\right)k} e^{j\phi[k]} \end{array}\right\}$$

$$= \frac{1}{L}\left\{\begin{array}{l} x_2[0]\sum_{k=0}^{L-1} e^{j\frac{2\pi}{L}nk}(1+e^{j\phi[k]}) + \\ x_2[1]\sum_{k=0}^{L-1} e^{j\frac{2\pi}{L}(n-1)k}(1+e^{j\phi[k]}) + \ldots + \\ x_2\left[\frac{L}{2}-1\right]\sum_{k=0}^{L-1} e^{j\frac{2\pi}{L}\left(n-\frac{L}{2}-1\right)k}(1+e^{j\phi[k]}) \end{array}\right\}$$

(30)

Figure 10:
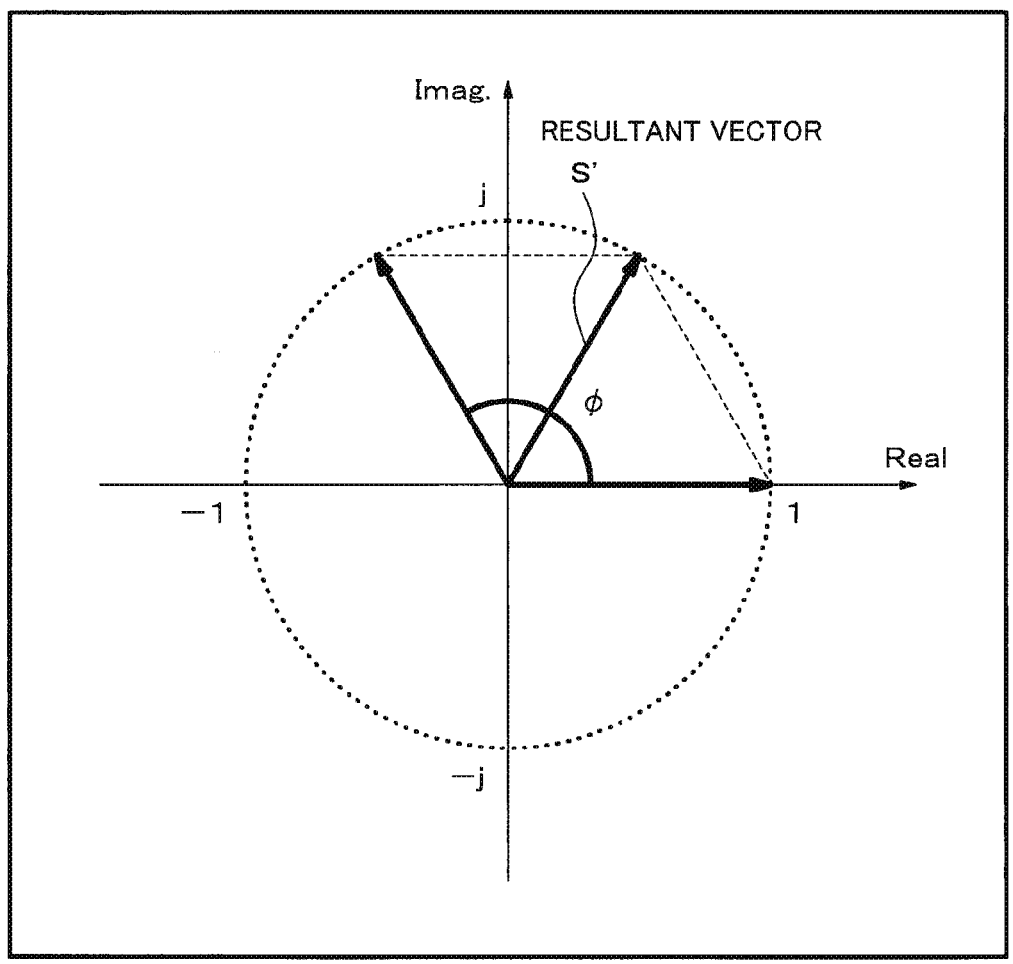
FIG. 10 It is a chart showing a frequency domain signal by a vector when performing phase rotation in a frequency domain in the second exemplary embodiment of the present invention.

Here, because an item (indicated in the equation (31)) in the parenthesis in the respective items is a vector synthesis, when a specific frequency k is noted, it can be drawn as shown in FIG. 10.

[Equation 31]

$$1 + e^{j\phi[k]} \quad (31)$$

Figure 11:
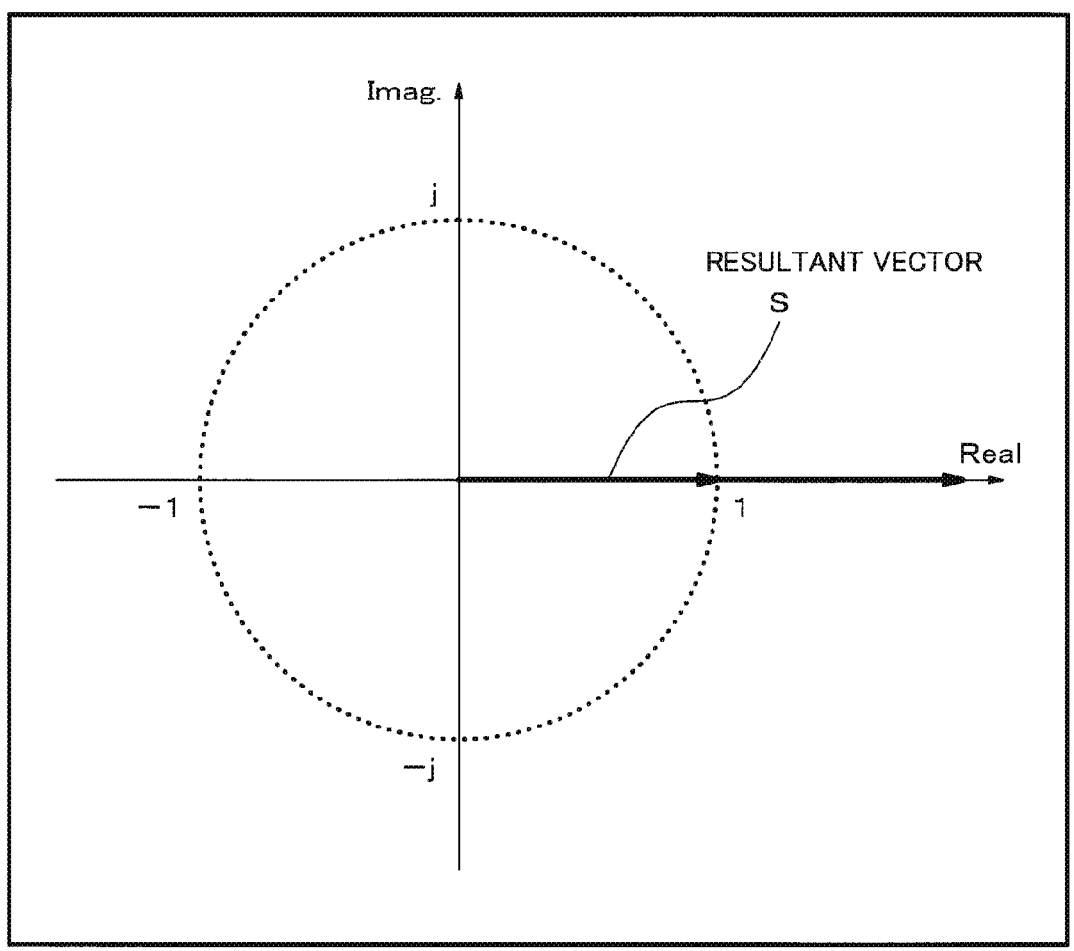
FIG. 11 It is a chart showing a frequency domain signal by a vector when not performing phase rotation in a frequency domain in the second exemplary embodiment of the present invention.

When phase rotation is not performed, in other words, in case of φ[k]=0, it becomes as shown in FIG. 11. When an absolute value of the equation (31) is obtained, it becomes the following equation (32).

[Equation 32]

$$|1 + e^{j\phi[k]}| = |1 + \cos\phi[k] + j\sin\phi[k]| \quad (32)$$
$$= \sqrt{(1+\cos\phi[k])^2 + \sin^2\phi[k]}$$
$$= \sqrt{1 + 2\cos\phi[k] + \cos^2\phi[k] + \sin^2\phi[k]}$$
$$= \sqrt{2(1+\cos\phi[k])}$$

Therefore, the condition that an absolute value of the equation (31) is maximized is in case of φ[k]=0, and the value is 2. That is, when the phase rotation is performed, it is understood that the size of the output signal becomes small.

The compensation amount calculation unit 503 determines an amplitude compensation amount of the enhanced signal amplitude spectrum so that the decreased amount of this output signal level is compensated.

Here, assuming that the phase rotation amount is determined using the uniform random number, a calculation method of the compensation amount is specifically described. Here, paying attention to the change of the phase by the rotation, each frequency component shall be normalized by a unit vector for simplification of the problem.

First, a case where the phase rotation is not performed is considered. A resultant vector when the phase is identical between continuous frames becomes like a vector S shown in FIG. 11, and the size |S| of the vector is represented by the following equation (33).

[Equation 33]

$$|S| = \sqrt{\{1+1\}^2} \quad (33)$$
$$= \sqrt{2^2}$$
$$= 2$$

On the other hand, when the phase rotation is performed using the uniform random number, the phase difference φ between the continuous frames is distributed over the range from −π to +π uniformly. A resultant vector when the phase is different between continuous frames becomes like a vector S' shown in FIG. 10. The size |S'| of the vector is expressed by the following equation (34).

[Equation 34]

$$|S'| = \sqrt{\{1+\cos\phi\}^2 + \{\sin\phi\}^2} \quad (34)$$
$$= \sqrt{2 + 2\{\cos\phi\}}$$

By the way, here, when an expectation E (|S'|^2) is obtained, it becomes like the following equation (35).

[Equation 35]

$$E(|S'|^2) = E(2+2\cos\phi) = E(2) + E(2\cos\phi) \quad (35)$$

Here, because the $\phi$ is distributed uniformly from $-\pi$ to $+\pi$, it becomes like the following equation (36).

[Equation 36]

$$E(2\cos(\phi)) = 0 \tag{36}$$

Therefore, the expectation of $|S'|^2$ is expressed by the following equation (37).

[Equation 37]

$$E(|S'|^2) = 2 \tag{37}$$

By the way, the expectation E ($|S|^2$) is expressed by the following equation (38) from the equation (33) when not performing a rotation of the phase.

[Equation 38]

$$\begin{aligned} E(|S|^2) &= E(2^2) \\ &= E(4) \\ &= 4 \end{aligned} \tag{38}$$

When taking the ratio of the equation (37) and the equation (38), the following equation (39) is established.

[Equation 39]

$$E(|S'|^2)/E(|S|^2) = 2/4 = 1/2 \tag{39}$$

That is, when the phase is rotated by the uniform random number, the power mean value of the output signal becomes small by only ½ compared with that of the input. The amplitude compensation unit 504 performs compensation to the amplitude value. Therefore, the compensation amount calculation unit 503 makes the compensation coefficient sqrt(2) and transmits it to the amplitude compensation unit 504.

Here, although the case of the rotation amount generation using the uniform random number was described as an example, the compensation coefficient is set uniquely if the variance and the mean value for normal random numbers are decided. Derivation of the compensation coefficient when using the normal random number will be described below.

The probability of occurrence of $\phi$ in case of the normal random number is determined using the normal distribution. Therefore, in order to obtain a power expectation when performing the phase rotation using the normal random number, the weighting is needed based on the probability of occurrence for $\phi$.

Specifically, a weighting function f($\phi$) based on the probability of occurrence of $\phi$ is introduced. The cos($\phi$) is weighted by using the weighting function f($\phi$). Further, the power expectation can be obtained using normalizing by an integral value of the weighting function f($\phi$).

The output power expectation E ($S''^2$) when performing the phase rotation using the normal random number, is represented like the following equation (40) by introducing the weighting function f($\phi$) and the integral value into the equation (35) which is the output power expectation of the uniform random number.

[Equation 40]

$$E(|S''^2|) = E(2) + E\left(\frac{f(\phi)}{\int_{-\pi}^{\pi} f(\phi) d\phi} \cos(\phi)\right) \tag{40}$$

Because the weighting function f($\phi$) can be represented using the normal distribution, the following equation (41) is established.

[Equation 41]

$$f(\phi) = \frac{1}{\sqrt{2\pi}\,\sigma} \exp\left(-\frac{(\phi - \mu)^2}{2\sigma^2}\right) \tag{41}$$

Here, $\sigma$ represents a variance and $\mu$ represents a mean value.

For example, in standard normal distribution of the mean value $\mu=0$ and the variance $\sigma=1$, because it becomes the following equation (42), when this is substituted for the equation (40), it becomes like the equation (43).

[Equation 42]

$$f(\phi) = \frac{1}{\sqrt{2\pi}} \exp\left(-\frac{\phi^2}{2}\right) \tag{42}$$

[Equation 43]

$$E(|S''^2|) = E(2) + E\left(\frac{\exp\left(-\frac{\phi^2}{2}\right)}{\int_{-\pi}^{\pi} \exp\left(-\frac{\phi^2}{2}\right) d\phi} \cos(\phi)\right) \tag{43}$$

Here, because the equation (44) is established when numerical value of the second item of the right side of the equation (43) is calculated, the ratio of it and the E ($|S^2|$) is represented by the equation (45) when not performing the rotation of the phase.

[Equation 44]

$$E(|S''|^2) = 2\{1 + 0.609\} = 3.218 \tag{44}$$

[Equation 45]

$$E(|S''|^2)/E(|S|^2) = 3.218/4 = 0.805 \tag{45}$$

When the phase is rotated by the normal random number of the standard normal distribution, the compensation amount calculation unit 503 makes the compensation coefficient as sqrt(1/0.805) and transmits it to the amplitude compensation unit 504. The phase control unit 202 may perform the phase rotation in all frequencies or may perform in a part of frequency. The amplitude control unit 203 performs amplitude compensation only in the frequency in which the phase rotation is performed. Therefore, the compensation coefficient of the frequency in which the phase rotation is not performed is made 1.0. The compensation coefficient of the frequency performed the phase rotation only becomes a derived value.

<<Explanation of the Amplitude Compensation Unit 504>>

The amplitude control unit 203 calculates the amplitude compensation coefficient using the rotation amount of the phase transmitted from the phase control unit 202. The amplitude control unit 203 multiplies the enhanced signal amplitude spectrum supplied from the noise suppression unit 205 by the calculated amplitude compensation coefficient, and supplies it to the reverse transform unit 204. Based on multiplying the enhanced signal amplitude spectrum by the amplitude compensation coefficient, the noise suppression device 200 can rotate the noisy signal phase spectrum and cancel the reduced output level when the enhanced signal phase spectrum is obtained.

As described above, the noise suppression device 200 according to this exemplary embodiment can remove influence on the output signal level with rotating operation of the phase spectrum by the amplitude control unit 203. Therefore, the noise suppression device 200 can obtain the high quality enhanced signal.

(Third Exemplary Embodiment)

Figure 12:
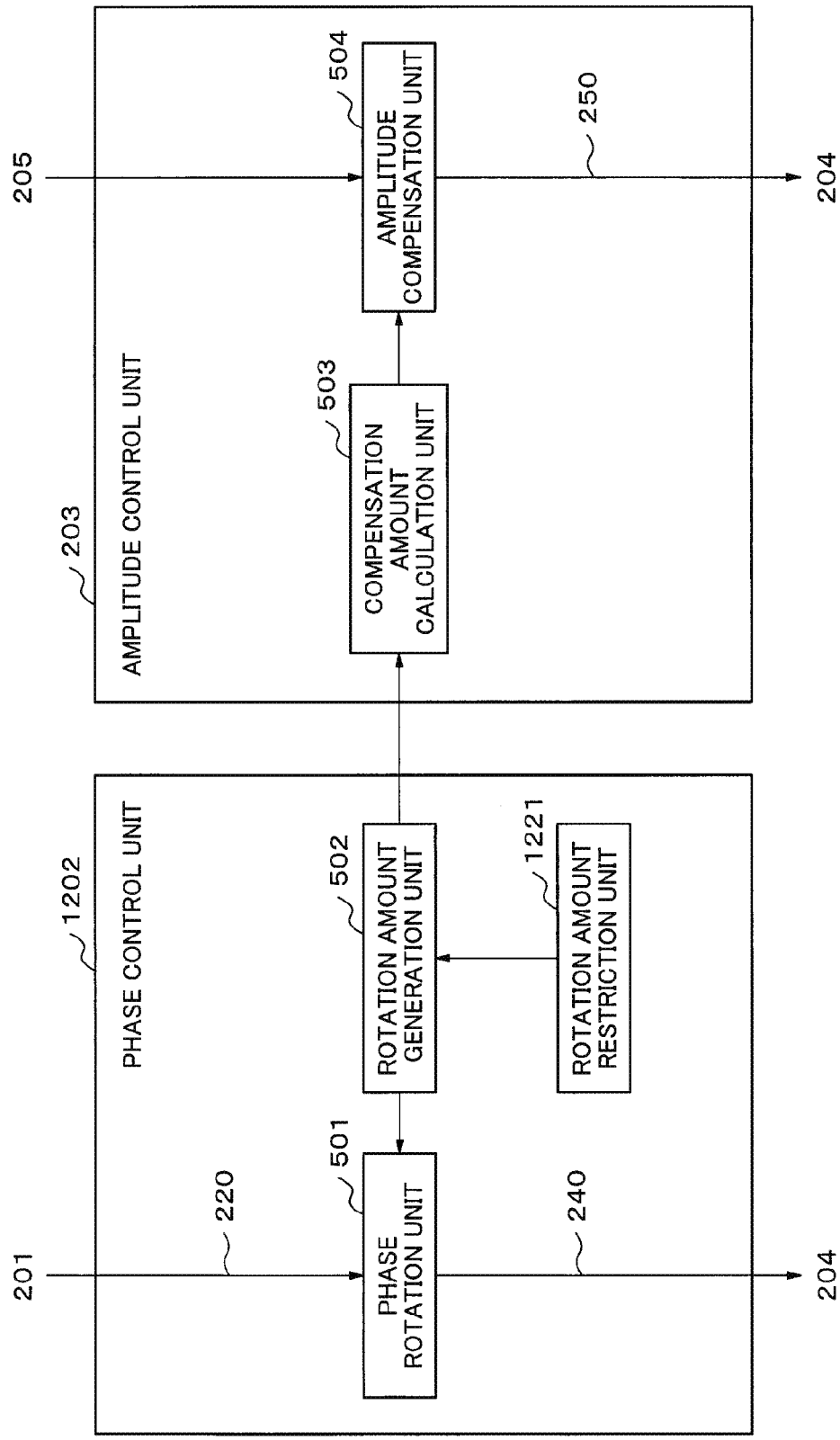
FIG. 12 It is a block diagram showing a construction of a phase control unit and an amplitude control unit according to a third exemplary embodiment of the present invention.

A third exemplary embodiment of the present invention is described using FIG. 12. This exemplary embodiment is different from the second exemplary embodiment in a point that the upper limit of the rotation amount of the phase is restricted. Because it is the same as that of the second exemplary embodiment for the construction and the operation except for it, the detailed explanation will be omitted here.

FIG. 12 is a block diagram showing a construction of a phase control unit 1202 and an amplitude control unit 203 according to this exemplary embodiment. As shown in FIG. 12, the phase control unit 1202 in this exemplary embodiment includes a rotation amount restriction unit 1221 in addition to the rotation amount generation unit 502 and the phase rotation unit 501 described in the second exemplary embodiment. The rotation amount generation unit 502 generates the rotation amount of the noisy signal phase spectrum receiving the restrictions from a rotation amount restriction unit 1221, and supplies it to the phase rotation unit 501.

The rotation amount restriction unit 1221 restricts the rotation amount generated by the rotation amount generation unit 502 in a fixed range. That is, the rotation amount restriction unit 1221 restricts the distribution of φ to the optional range from 0 to 2π. For example, the rotation amount restriction unit 1221 restricts the distribution of φ like 0 to π/2. Hereby, the feature of the noisy signal phase spectrum remains in the enhanced signal phase spectrum to some extent. Because the feature of the noisy signal is hold to some extent compared with a case where the phase is rotated at random completely, an influence to an object sound becomes little. Therefore, distortion of the object sound is reduced.

The present invention according to this exemplary embodiment can reduce a deterioration of the object sound based on restricting the rotation amount of the phase in addition to the effect of the second exemplary embodiment.

(Fourth Exemplary Embodiment)

A fourth exemplary embodiment of the present invention will be described using FIG. 13. The present invention according to this exemplary embodiment is different from the second exemplary embodiment in a point that a compensation amount is calculated by delaying the phase component and obtaining a difference in the phase components between the frames. That is, it is different from the second exemplary embodiment in an internal configuration of a phase control unit 1302 and an amplitude control unit 1303. Because other construction and operation are the same as that of the second exemplary embodiment, the description will be omitted here.

Figure 13:
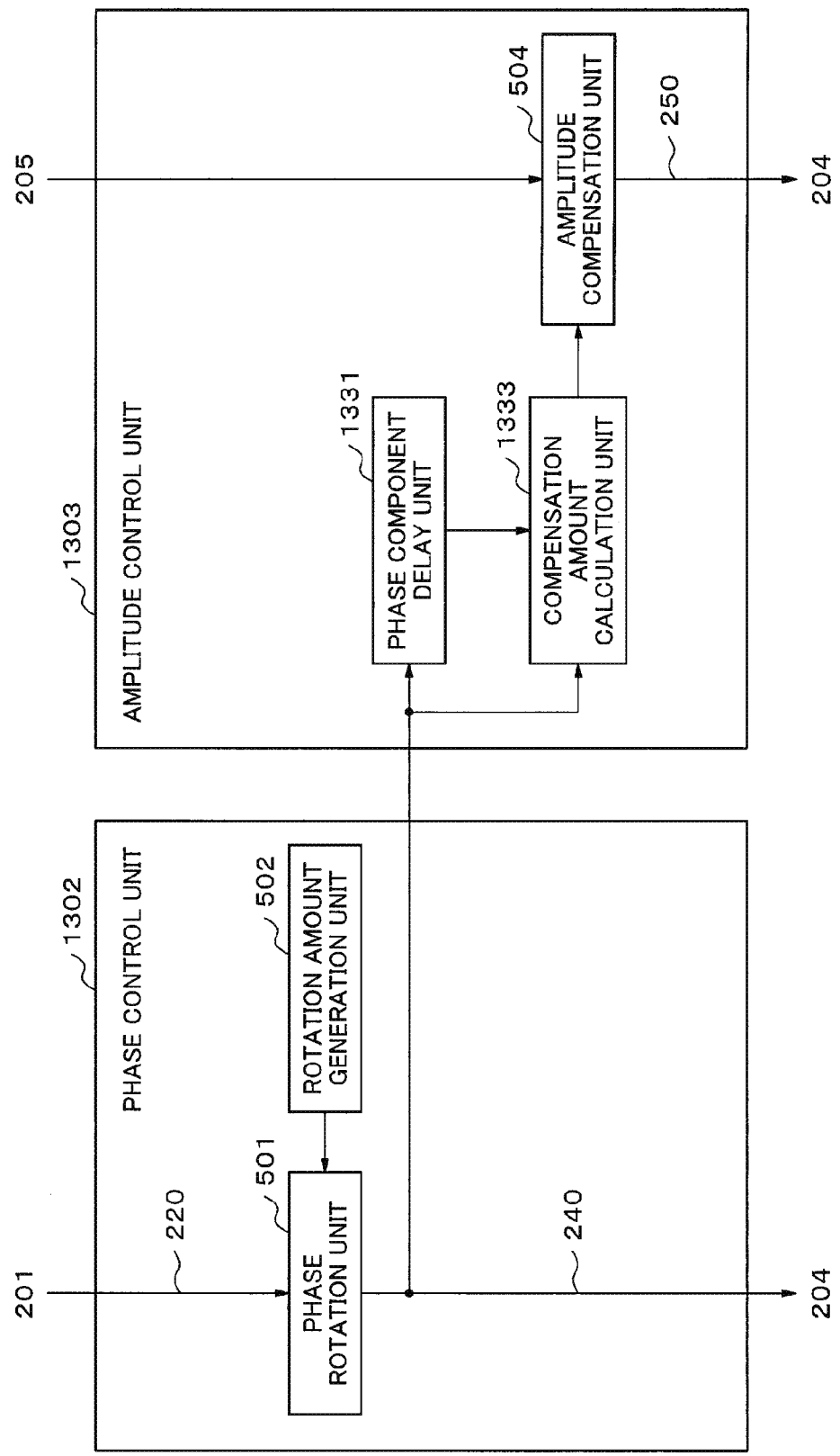
FIG. 13 It is a block diagram showing a construction of a phase control unit and an amplitude control unit according to a fourth exemplary embodiment of the present invention.

FIG. 13 is a block diagram showing a construction of the phase control unit 1302 and the amplitude control unit 1303 in this exemplary embodiment. As shown in FIG. 13, the phase control unit 1302 in the fourth exemplary embodiment includes a rotation amount generation unit 502 and a phase rotation unit 501 included in the second exemplary embodiment. The phase control unit 1302 supplies the phase after a rotation to the amplitude control unit 1303. And, the amplitude control unit 1303 includes a phase component delay unit 1331, a compensation amount calculation unit 1333 and an amplitude compensation unit 504.

The phase component delay unit 1331 holds one frame of an enhanced signal phase spectrum supplied from the phase rotation unit 501, and supplies it to the compensation amount calculation unit 1333.

The compensation amount calculation unit 1333 calculates an amplitude compensation amount from the enhanced signal phase spectrum before one frame from the phase component delay unit 1331 and the present enhanced signal phase spectrum from the phase rotation unit 501, and transmits it to the amplitude compensation unit 504.

The phase component delay unit 1331 holds one frame of the enhanced signal phase spectrum and delays it by one frame, and supplies it to the compensation amount calculation unit 1333. The phase component delay unit 1331 is realized by delaying the enhanced signal phase spectrum of one frame simply.

The present invention according to this exemplary embodiment can compensate the output level in addition to the effect of the second exemplary embodiment, even when the expectation of the output level cannot be derived Equationly as the phase rotation amount. For example, although there is a deviation in the probability of occurrence in a random number using a random number table, the present invention according to this exemplary embodiment can compensate the output level satisfactorily.

The compensation amount calculation unit 1333 obtains the size of the resultant vector in each frequency from the enhanced signal phase spectra of the previous frame and the present frame, and determines the compensation coefficient from the size. When the phase of the previous frame is α and the phase of the present frame is β, then, the size |S'| of the resultant vector is represented by the following equation (46).

[Equation 46]

$$|S'| = \sqrt{\{\cos\alpha + \cos\beta\}^2 + \{\sin\alpha + \sin\beta\}^2} \quad (46)$$
$$= \sqrt{2 + 2\{\sin\alpha\sin\beta\} + 2\{\cos\alpha\cos\beta\}}$$

The size |S| of the resultant vector when the phases of the continuous frames are in accord is |S|=2 as it has already been derived by the equation (33). Therefore, the amplitude compensation amount is represented by the following equation (47).

[Equation 47]

$$|S|/|S'|2/\sqrt{2+2\{\sin\alpha\sin\beta\}+2\{\cos\alpha\cos\beta\}} \quad (47)$$

The present invention according to this exemplary embodiment can cancel a fall of output level by supplying this value to the amplitude control unit 203 and compensating the enhanced signal amplitude spectrum. In this exemplary embodiment, because the construction and the operation other than the phase rotation unit are the same as those of the second exemplary embodiment, the explanation will be omitted here.

(Fifth Exemplary Embodiment)

Figure 14:
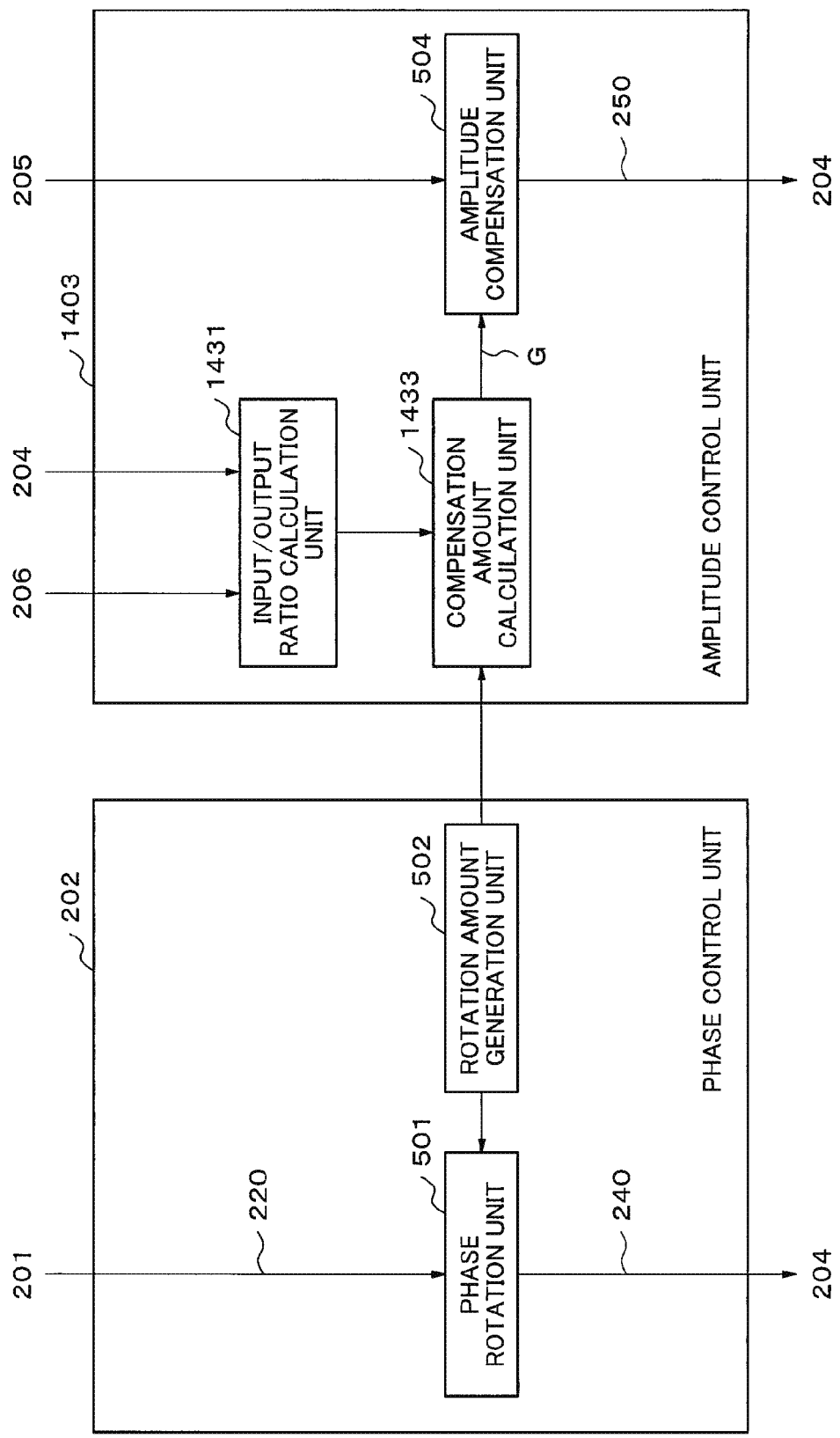
FIG. 14 It is a block diagram showing a construction of a phase control unit and an amplitude control unit according to a fifth exemplary embodiment of the present invention.

A fifth exemplary embodiment of the present invention will be described using FIG. 14. FIG. 14 is a block diagram showing a construction of a phase control unit 202 and an amplitude control unit 1403 according to this exemplary embodiment.

The present invention according to this exemplary embodiment is different from the second exemplary embodiment in a point including an input/output ratio calculation unit 1431. The input/output ratio calculation unit 1431 receives a noisy signal from an input terminal 206 and an enhanced signal from a reverse transform unit 204, and calculates a ratio of an input/output level. The input/output ratio calculation unit 1431 supplies the ratio of the input/output level to a compensation amount calculation unit 1433. The compensation amount calculation unit 1433 calculates a compensation amount so that the level of an enhanced signal becomes equal to a noisy signal. The amplitude compensation unit 504 compensates an enhanced signal amplitude spectrum using the calculated compensation amount.

The input/output ratio calculation unit 1431 obtains the ratio of the level from a time domain signal of the noisy signal and the enhanced signal.

A level ratio R of the noisy signal yn(t) of the n th frame and the enhanced signal xn(t) of the n th frame is represented by the following equation (48). Here, t shows a sampling time. L shows a frame length of the Fourier transform.

[Equation 48]

$$R = \sum_{t=0}^{L-1} x_n(t) \bigg/ \sum_{t=0}^{L-1} y_n(t) \qquad (48)$$

The compensation amount calculation unit 1433 obtains an amplitude compensation amount G based on this ratio value R and the number of the frequency components which were performed the phase rotation. When a time domain signal is divided into N frequency components by the transform unit and the phase rotation is performed to M phase spectrums, the amplitude compensation amount G is obtained like the following equation (49).

[Equation 49]

$$G = \frac{M}{N(R-1) + M} \qquad (49)$$

And, the amplitude control unit 1403 performs amplitude compensation only in the frequency which was performed the phase rotation based on information of presence or absence of the phase rotation transmitted from the phase control unit 202. In this exemplary embodiment, because the construction and the operation other than the input/output ratio calculation unit 1431 and the compensation amount calculation unit 1433 are the same as those of the second exemplary embodiment, the explanation will be omitted here.

Because the compensation coefficient is obtained from the signal of the time domain, the present invention according to this exemplary embodiment can compensate the output level, by whatever kind of method the phase rotation is determined.

(Sixth Exemplary Embodiment)

Figure 15:
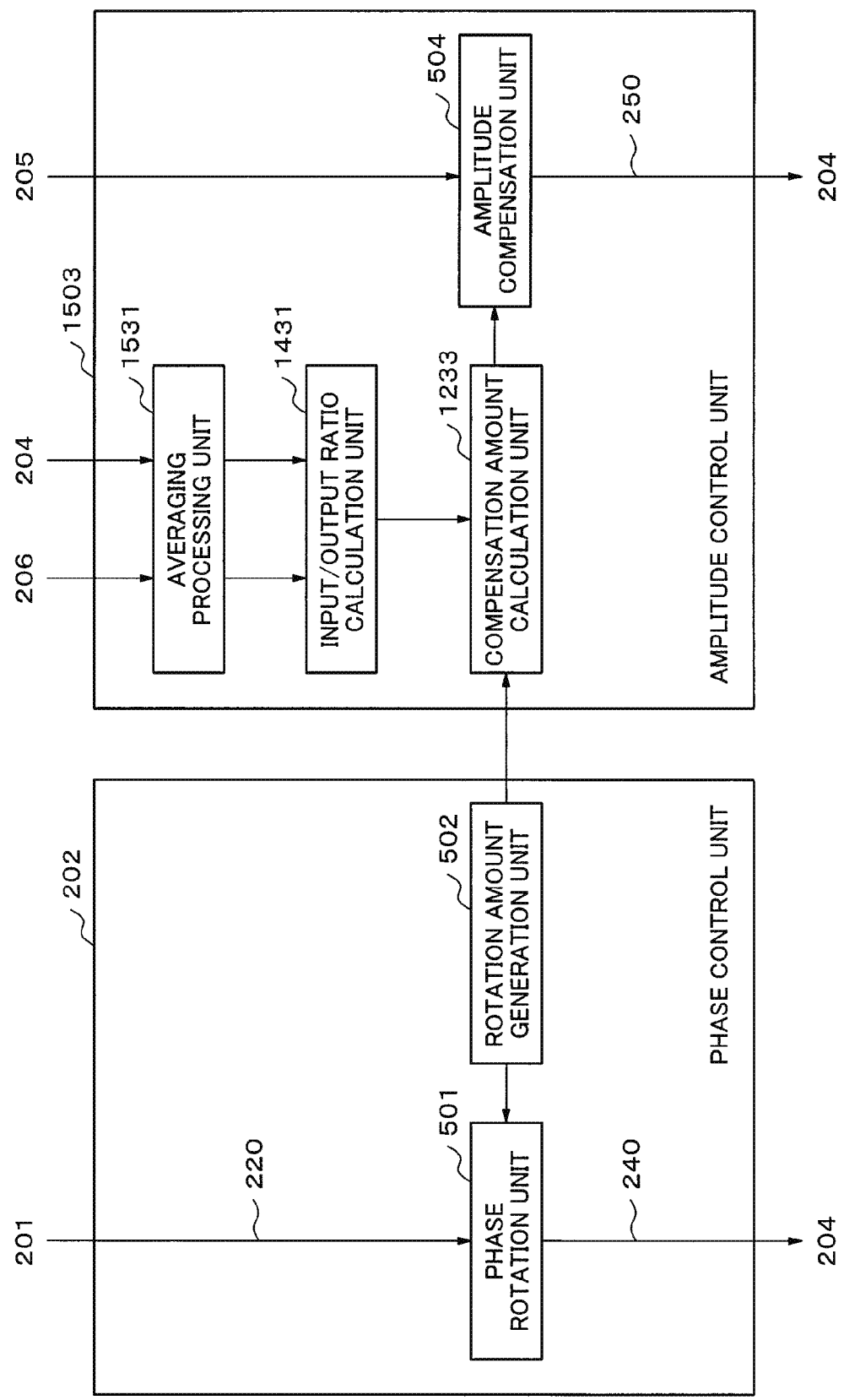
FIG. 15 It is a block diagram showing a construction of a phase control unit and an amplitude control unit according to a sixth exemplary embodiment of the present invention.

A sixth exemplary embodiment of the present invention will be described using FIG. 15. FIG. 15 is a block diagram showing a construction of a phase control unit 202 and an amplitude control unit 1503 according to this exemplary embodiment. As shown in FIG. 15, the amplitude control unit 1503 in this exemplary embodiment includes an averaging processing unit 1531 in addition to the input/output ratio calculation unit 1431 included in the fifth exemplary embodiment. Because the construction and the operation other than the averaging processing unit 1531 are the same as those of the fifth exemplary embodiment, the explanation will be omitted here.

The averaging processing unit 1531 receives a noisy signal from an input terminal 206, performs averaging processing, and supplies a mean value of it to an input/output ratio calculation unit 1431. And, the averaging processing unit 1531 receives an enhanced signal from a reverse transform unit 204, performs averaging processing, and supplies a mean value of it to the input/output ratio calculation unit 1431. The input/output ratio calculation unit 1431 receives mean values of the noisy signal and the enhanced signal from the averaging processing unit 1531, and calculates their level ratio.

The averaging processing unit 1531 equalizes the levels of the noisy signal and the enhanced signal in an arbitrary time length. Specifically, the averaging processing unit 1531 equalizes the levels of the noisy signal and the enhanced signal using a moving average and leaky integration.

The present invention according to this exemplary embodiment can suppress a change in a compensation amount and realize a quality improvement of an output signal by using the equalized level in addition to the effect of the fifth exemplary embodiment.

(Seventh Exemplary Embodiment)

Figure 16:
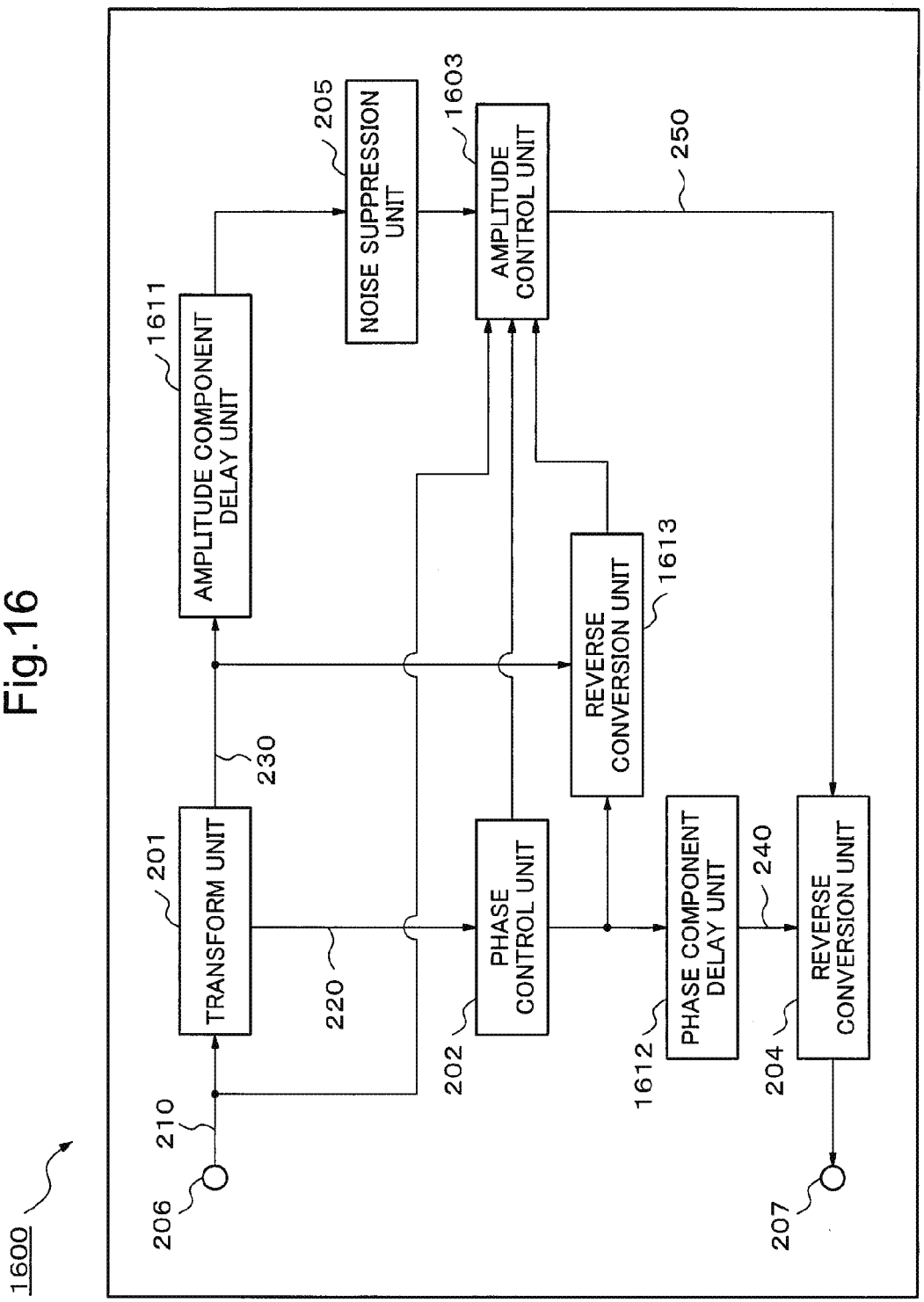
FIG. 16 It is a block diagram showing a schematic configuration of a noise suppression device as a seventh exemplary embodiment of the present invention.
Figure 17:
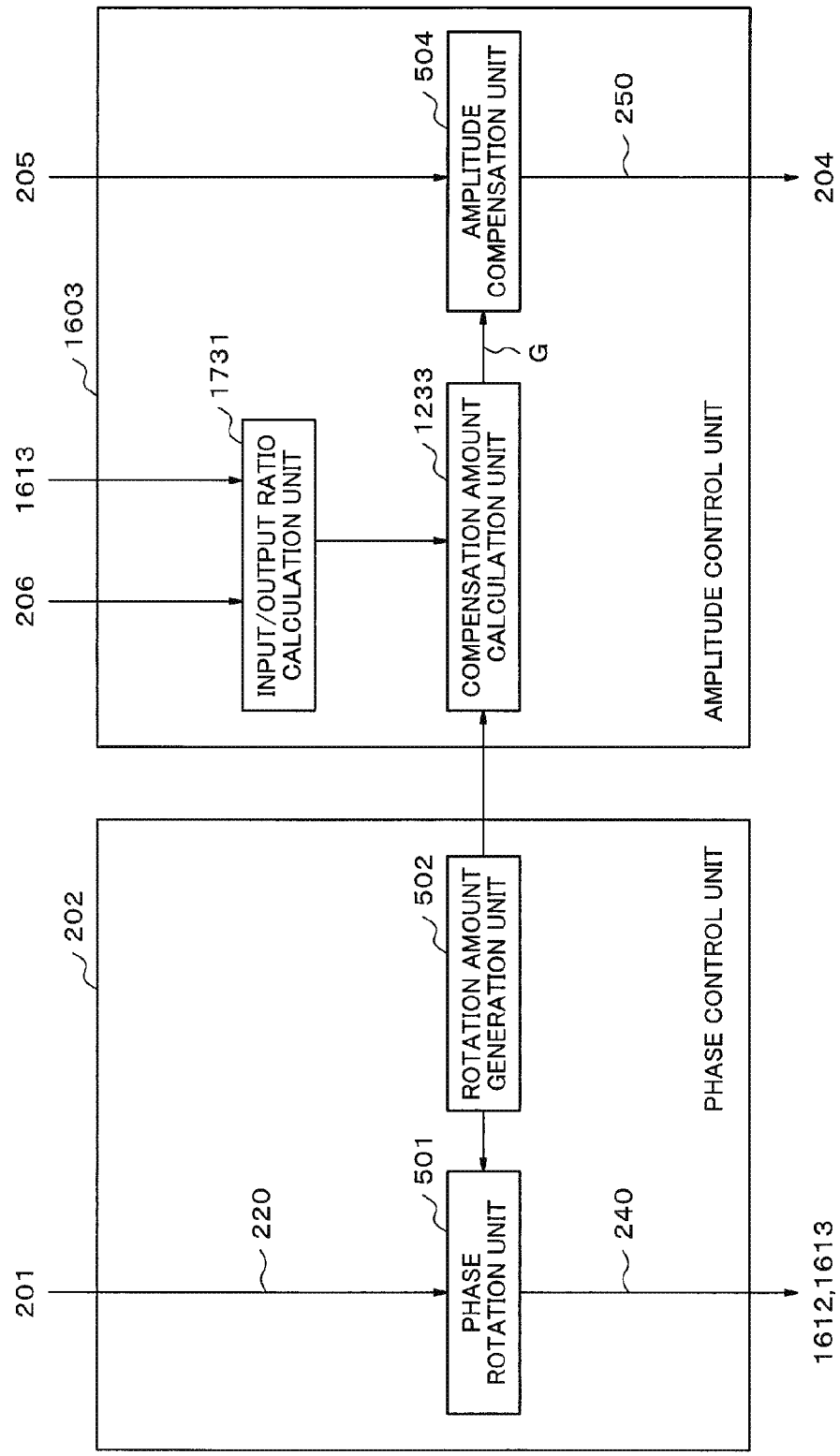
FIG. 17 It is a block diagram showing a construction of a phase control unit and an amplitude control unit according to the seventh exemplary embodiment of the present invention.

A seventh exemplary embodiment of the present invention is described using FIG. 16 and FIG. 17. FIG. 16 is a chart showing a construction of a noise suppression device 1600 according to this exemplary embodiment. The noise suppression device 1600 according to this exemplary embodiment includes an amplitude component delay unit 1611, a phase component delay unit 1612 and a reverse transform unit 1613 in addition to the construction of FIG. 2 in the second exemplary embodiment. And, there is also a difference in an internal configuration of an amplitude control unit 1603. Because the operations other than the amplitude component delay unit 1611, the phase component delay unit 1612 and the amplitude control unit 1603 are the same as those of the sixth exemplary embodiment, the explanation will be omitted here.

A noisy signal supplied to an input terminal 206 is supplied to a transform unit 201 and an amplitude control unit 1603. The transform unit 201 supplies a noisy signal amplitude spectrum 230 to the amplitude component delay unit 1611 and the reverse transform unit 1613. And, the transform unit 201 supplies a noisy signal phase spectrum 220 to a phase control unit 202. The phase control unit 202 rotates the noisy signal phase spectrum 220 supplied from the transform unit 201, and supplies it to the reverse transform unit 1613 and the phase component delay unit 1612 as an enhanced signal phase spectrum. And, the phase control unit 202 transmits presence or absence of phase rotation amount in each frequency to the amplitude control unit 1603.

The reverse transform unit 1613 transmits a signal produced for the level fall by the phase rotation to the amplitude control unit 1603 using the noisy signal amplitude spectrum 230 supplied from the transform unit 201 and the noisy signal phase spectrum supplied from the phase control unit 202.

The amplitude component delay unit 1611 delays the noisy signal amplitude spectrum 230 from the transform unit 201, and supplies it to a noise suppression unit 205.

The phase component delay unit 1612 delays the enhanced signal phase spectrum from the phase control unit 202, and supplies it to a reverse transform unit 204. The noise suppression unit 205 presumes a noise using the noisy signal amplitude spectrum supplied from the amplitude component delay unit 1611, and generates an estimated noise spectrum.

The reverse transform unit 204 synthesizes an enhanced signal phase spectrum 240 supplied from the phase control unit 202 via the phase component delay unit 1612 and a compensated amplitude spectrum 250 supplied from the amplitude control unit 1603, performs inverse transform and supplies it to an output terminal 207 as an enhanced signal.

The noisy signal phase spectrum 220 is controlled by the phase control unit 202, and is transformed into a signal of time domain by the reverse transform unit 1613. The amplitude control unit 1603 obtains the variation amount of the level by the phase rotation using the signal and a noisy signal 210.

This variation amount is a change only in a rotation processing by the phase rotation unit 501. Accordingly, the amplitude control unit 1603 can catch the level variation by the phase rotation correctly. Although the amplitude control unit 1603 performs amplitude compensation using this level ratio, an obtained level ratio is the one before one frame.

Therefore, the amplitude component delay unit 1611 and the phase component delay unit 1612 are introduced, and the amplitude control unit 1603 performs amplitude compensation to a frequency component before one frame.

FIG. 17 is a block diagram for explaining an internal configuration of the phase control unit 202 and the amplitude control unit 1603 according to this exemplary embodiment. An input/output ratio calculation unit 1731 calculates a level ratio from the noisy signal supplied from the input terminal 206 and the signal including the reduced level part based on the phase rotation supplied from the reverse transform unit 1613, and supplies it to a compensation amount calculation unit 1233.

The compensation amount calculation unit 1233 receives information on presence or absence of phase rotation in each frequency from the phase control unit 202, and calculates an amplitude compensation amount. The amplitude compensation unit 504 compensates an enhanced signal phase spectrum in each frequency based on the amplitude compensation amount, and supplies it to the reverse transform unit 204. In addition, the amplitude component delay unit 1611 may be introduced between the noise suppression unit 205 and the amplitude control unit 1603.

In addition to the effect of the fifth exemplary embodiment, the noise suppression device 1600 according to this exemplary embodiment can avoid delay of the input/output ratio which is inescapable in the fifth embodiment and the sixth embodiment, and can realize more accurate compensation of an output level.

(Eighth Exemplary Embodiment)

Figure 18:
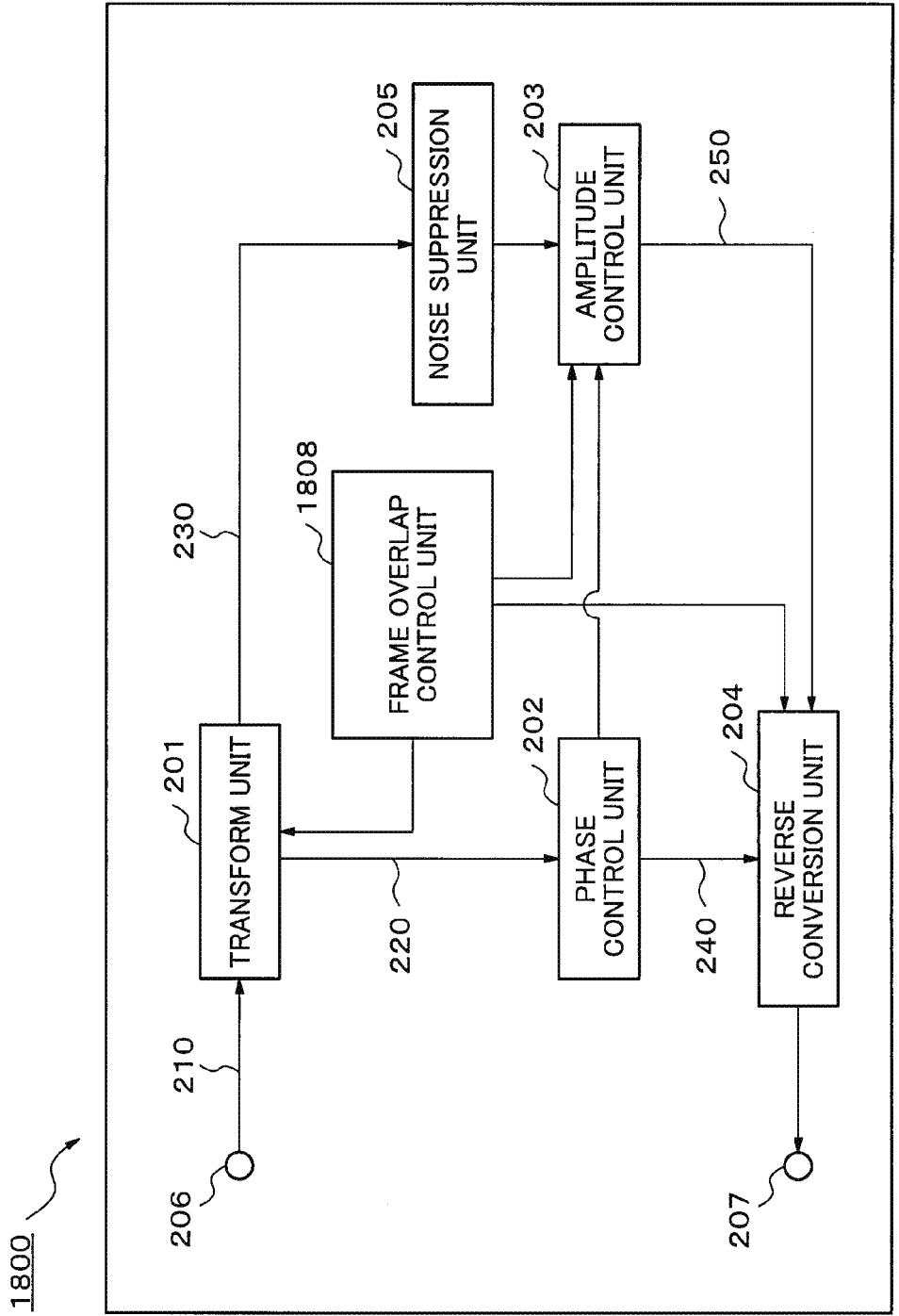
FIG. 18 It is a block diagram showing a schematic configuration of a noise suppression device as an eighth exemplary embodiment of the present invention.

An eighth exemplary embodiment of the present invention is described using FIG. 18. As shown in FIG. 18, a noise suppression device 1800 according to this exemplary embodiment includes a frame overlap control unit 1808 in addition to the construction of the second exemplary embodiment. In a transform unit 201 and a reverse transform unit 204, the frame overlap control unit 1808 performs frame division and control of the overlap rate when synthesized. The frame overlap control unit 1808 supplies its overlap rate to an amplitude control unit 203. The level fall based on phase rotation occurs due to overlap as already described. This level fall amount changes with the overlapping rate, and the fall amount also becomes large, so that the overlapping rate becomes large. Therefore, an amplitude compensation amount need to be controlled when the overlapping rate changes.

Specifically, the noise suppression device 1800 obtains a compensation amount based on the amplitude compensation amount G when the overlapping rate is 50%.

When the overlapping rate is 0%, the amplitude compensation is not needed. And, when the overlapping rate is 50%, the amplitude compensation amount is G. Therefore, the amplitude compensation amount becomes like the following equation (50) using a ratio of a frame length L and an overlap length Q. Here, G' is the amplitude compensation amount performed compensation based on the overlapping rate.

[Equation 50]

$$G' = \left(1 - \frac{2Q}{L}\right) \cdot 1 + \frac{2Q}{L}G = 1 + \frac{2Q}{L}(G-1) \tag{50}$$

For example, in case of the overlapping rate 50%, because Q is Q=L/2, the following equation (51) is established. In case of the overlapping rate 25%, because Q is Q=L/4, the following equation (52) is established.

[Equation 51]

$$G' = 1 + \frac{2\frac{L}{2}}{L}(G-1) = 1 + G - 1 = G \tag{51}$$

[Equation 52]

$$G' = 1 + \frac{2\frac{L}{4}}{L}(G-1) = 1 + \frac{1}{2}G - \frac{1}{2} = \frac{1}{2} + \frac{1}{2}G \tag{52}$$

The amplitude control unit 203 compensates a compensation coefficient transmitted from the phase control unit 202 based on the equation (50) and compensates the enhanced signal amplitude spectrum. In this exemplary embodiment, because the construction and operation other than the frame overlap control unit 1808 are the same as those of the second exemplary embodiment, the explanation will be omitted here.

The noise suppression device 1800 according to this exemplary embodiment can set the overlapping rate of the frames freely in addition to the effect of the second exemplary embodiment.

(Ninth Exemplary Embodiment)

Figure 19:
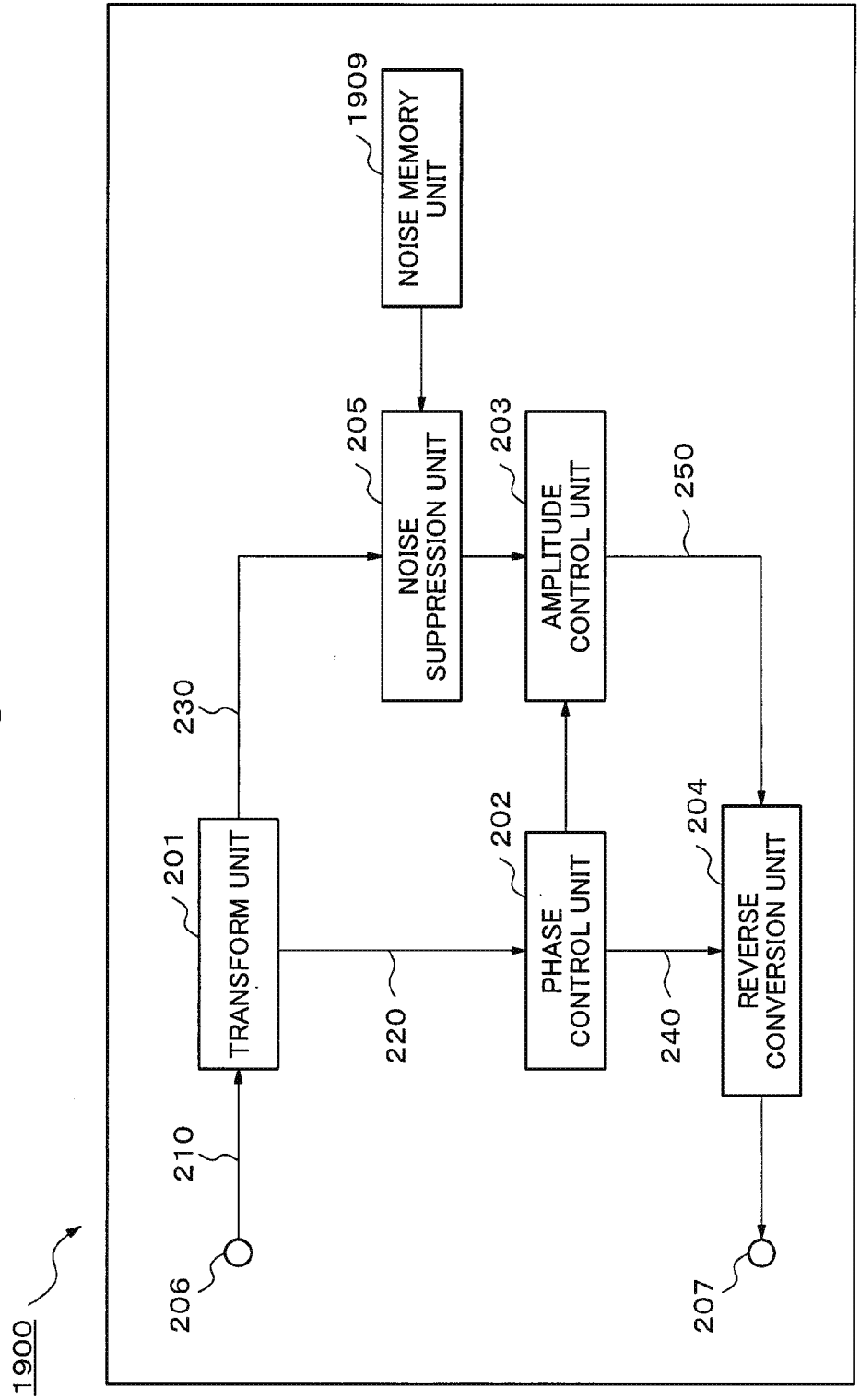
FIG. 19 It is a block diagram showing a schematic configuration of a noise suppression device as a ninth exemplary embodiment of the present invention.

A ninth exemplary embodiment of the present invention is described using FIG. 19. In FIG. 19, a noise memory unit 1909 is connected to a noise suppression unit 205. A noise suppression device 1900 according to this exemplary embodiment suppresses a noise using a known noise spectrum. The noise memory unit 1909 stores a spectrum of a noise which should be suppressed. The noise suppression device 1900 can suppress only noise of a suppression target by the noise suppression unit 205 performing noise suppression based on the stored noise spectrum.

Here, as a spectrum of noise, the noise memory unit 1909 may store an average spectrum, the biggest spectrum and the smallest spectrum of the noise. Or, the noise memory unit 1909 may store those combinations. In this exemplary embodiment, because the construction and the operation other than the noise memory unit 1909 are the same as those of the second exemplary embodiment, the explanation will be omitted here.

The noise suppression device 1900 according to this exemplary embodiment can apply the effect of the second exemplary embodiment only to a specific noise, and can obtain a higher quality enhanced signal when the noise to be suppressed is clear.

(Other Exemplary Embodiments)

According to the first to the ninth exemplary embodiment described above, although a noise suppression device with the separate feature has been described respectively, a noise suppression device of any combination of those features is also included in the category of the present invention.

And, the present invention may be applied to a system which consists of a plurality of equipment, and it may be applied to a single apparatus. Further, the present invention can be applicable when a signal processing program of software which realizes the function of the exemplary embodiment is supplied to a system or an apparatus directly or remotely. Therefore, in order to realize the function of the present invention by a computer, a program installed in a computer, a medium which stored the program and a WWW server which makes the program download are also included in the category of the present invention.

FIG. 20 is a block diagram of a computer 2000 for executing a signal processing program when the first exemplary embodiment is composed using a signal processing program. The computer 2000 includes an input unit 2001, a CPU 2002, an output unit 2003 and a memory 2004.

The CPU 2002 controls operation of the computer 2000 based on reading a signal processing program. That is, the CPU 2002 executes a signal processing program stored in the memory 2004, and transforms a mixed signal in which a first signal and a second signal are mixed into a phase component and an amplitude component or a power component in each frequency (S2011). Next, the CPU 2002 rotates the phase component in predetermined frequency (S2012). In accordance with the amount of change of the amplitude component or the power component of the output signal which is generated by the phase rotation, the CPU 2002 compensates the amplitude component or the power component in predetermined frequency (S2013). The CPU 2002 synthesizes the phase component rotated based on the Step S2012 and the amplitude component or the power component compensated based on the Step S2013 (S2014).

Based on this, the same effect as the first exemplary embodiment can be obtained.

[Other Expressions of Exemplary Embodiments]

The whole or part of the exemplary embodiments disclosed above can be described as, but not limited to, the following supplementary notes.

(Supplementary Note 1)

A signal processing device has a transform means for transforming a mixed signal in whish a first signal and a second signal are mixed into a phase component and an amplitude component or a power component in each frequency; a first control means for rotating the phase component in predetermined frequency; a second control means for compensating the amplitude component or the power component in the predetermined frequency according to the amount of change of the amplitude component or the power component rotated by the first control means; and a synthesis means for synthesizing the phase component rotated by the first control means and the amplitude component or the power component compensated by the second control means.

(Supplementary Note 2)

The signal processing device according to supplementary note 1, wherein the first control means includes a rotation amount generation means for generating the amount of rotation of the phase component, and the second control means calculates the amount of change based on the amount of rotation supplied from the rotation amount generation means, and compensates the amplitude component or the power component according to the calculated amount of change.

(Supplementary Note 3)

The signal processing device according to supplementary note 1, wherein the second control means includes a phase component delay means for delaying the phase component, and the second control means calculates the amount of change by comparing the phase components before and after delay, and compensates the amplitude component or the power component according to the calculated amount of change.

(Supplementary Note 4)

The signal processing device according to supplementary note 1, wherein the second control means calculates the amount of change by comparing an output from the synthesis means with the mixed signal, and compensates the amplitude component or the power component according to the calculated amount of change.

(Supplementary Note 5)

The signal processing device according to supplementary note 4, wherein the second control means calculates the amount of change by comparing a mean value of the output from the synthesis means with a mean value of the mixed signal, and compensates the amplitude component or the power component according to the calculated amount of change.

(Supplementary Note 6)

The signal processing device according to supplementary note 1 further has an amplitude component delay means for delaying the amplitude component or the power component, wherein the second control means calculates the amount of change by comparing the output from the synthesis means with the mixed signal, and compensates the amplitude component or the power component delayed by the amplitude component delay means according to the calculated amount of change.

(Supplementary Note 7)

The signal processing device according to any one of supplementary notes 1 to 6, wherein the transform means includes a division means for dividing the mixed signal into a plurality of frames whose parts are overlapped each other, and the second control means further compensates the amplitude components or the power component in the predetermined frequency according to an overlap rate of the frames.

(Supplementary Note 8)

The signal processing device according to any one of supplementary notes 1 to 7, wherein the first control means includes a rotation amount restriction means for restricting the amount of rotation of the phase component.

(Supplementary Note 9)

A signal processing method including: a transform step of transforming a mixed signal in which a first signal and a second signal are mixed into a phase component and an amplitude component or a power component in each frequency; a first control step of rotating the phase component in predetermined frequency; a second control step of compensating the amplitude component or the power component in the predetermined frequency according to the amount of change of the amplitude component or the power component generated by the rotation performed by the first control step; and a synthesis step of synthesizing the phase component rotated by the first control step and the amplitude component or the power component compensated by the second control step.

(Supplementary Note 10)

A computer readable medium embodying a program, said program causing a signal processing device to perform a method, said method comprising: a transform step of transforming a mixed signal in which a first signal and a second signal are mixed into a phase component and an amplitude component or a power component in each frequency; a first control step of rotating the phase component in a predetermined frequency; a second control step of compensating the amplitude component or the power component in the predetermined frequency according to the amount of change of the amplitude component or the power component generated by the rotation performed by said first control step; and a synthesis step of synthesizing the phase component rotated by said first control step and the amplitude component or power component compensated by said second control step.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-261831, filed on Nov. 24 And 2010, the disclosure of which is incorporated herein in its entirety by reference.

The invention claimed is:

1. A signal processing device comprising:
   a transform unit which transforms a mixed signal in which a first signal and a second signal are mixed, into a phase component and an amplitude component or a power component in each frequency;
   a first control unit which rotates the phase component in a predetermined frequency;
   a second control unit which compensates the amplitude component or the power component in the predetermined frequency according to an amount of change of the amplitude component or the power component generated by the rotation of the phase component performed by said first control unit; and
   a synthesis unit which synthesizes the phase component rotated by said first control unit and the amplitude component or power component compensated by said second control unit.

2. The signal processing device according to claim 1, wherein
   said first control unit comprising:
   a rotation amount generation unit which generates an amount of rotation of the phase component, and
   said second control unit calculates the amount of change based on the amount of rotation supplied from said rotation amount generation unit, and compensates the amplitude component or the power component according to the calculated amount of change.

3. The signal processing device according to claim 1, wherein
   said second control unit comprising:
   a phase component delay unit which delays the phase component, and
   said second control unit calculates the amount of change by comparing the phase components before and after delay, and compensates the amplitude component or the power component according to the calculated amount of change.

4. The signal processing device according to claim 1, wherein
   said second control unit calculates the amount of change by comparing an output from said synthesis unit with the mixed signal, and compensates the amplitude component or the power component according to the calculated amount of change.

5. The signal processing device according to claim 4, wherein
   said second control unit calculates the amount of change by comparing a mean value of the output from said synthesis unit with a mean value of the mixed signal, and compensates the amplitude component or the power component according to the calculated amount of change.

6. The signal processing device according to claim 1 further comprising:
   an amplitude component delay unit which delays the amplitude component or the power component, wherein
   said second control unit calculates the amount of change by comparing the output from said synthesis unit with the mixed signal, and compensates the amplitude component or the power component delayed by said amplitude component delay unit according to the calculated amount of change.

7. The signal processing device according to claim 1, wherein
   said transform unit comprising:
   a division unit which divides the mixed signal into a plurality of frames which are partially overlapped with each other, and
   said second control unit further compensates the amplitude component or the power component in the predetermined frequency according to an overlap rate of the frames.

8. The signal processing device according to claim 1, wherein
   said first control unit comprising:
   a rotation amount restriction unit which restricts the amount of rotation of the phase component.

9. A signal processing method comprising:
   a transform step of transforming a mixed signal in which a first signal and a second signal are mixed into a phase component and an amplitude component or a power component in each frequency;
   a first control step of rotating the phase component in a predetermined frequency;
   a second control step of compensating the amplitude component or the power component in the predetermined frequency according to an amount of change of the amplitude component or the power component generated by the rotation of the phase component performed by said first control step; and
   a synthesis step of synthesizing the phase component rotated by said first control step and the amplitude component or power component compensated by said second control step.

10. A computer readable medium embodying a program, said program causing a signal processing device to perform a method, said method comprising:
    a transform step of transforming a mixed signal in which a first signal and a second signal are mixed into a phase component and an amplitude component or a power component in each frequency;
    a first control step of rotating the phase component in a predetermined frequency;
    a second control step of compensating the amplitude component or the power component in the predetermined frequency according to an amount of change of the amplitude component or the power component generated by the rotation of the phase component performed by said first control step; and
    a synthesis step of synthesizing the phase component rotated by said first control step and the amplitude component or power component compensated by said second control step.

* * * * *